(12) United States Patent
Tsuneki et al.

(10) Patent No.: US 11,126,149 B2
(45) Date of Patent: Sep. 21, 2021

(54) CONTROL PARAMETER ADJUSTING DEVICE AND ADJUSTING METHOD USING MACHINE LEARNING

(71) Applicant: FANUC CORPORATION, Yamanashi (JP)

(72) Inventors: Ryoutarou Tsuneki, Yamanashi (JP); Shunpei Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 14 days.

(21) Appl. No.: 16/286,982

(22) Filed: Feb. 27, 2019

(65) Prior Publication Data
US 2019/0317456 A1 Oct. 17, 2019

(30) Foreign Application Priority Data
Apr. 13, 2018 (JP) .............................. JP2018-077686

(51) Int. Cl.
*G05B 19/4155* (2006.01)
*G05B 13/02* (2006.01)

(52) U.S. Cl.
CPC ..... *G05B 13/0265* (2013.01); *G05B 19/4155* (2013.01)

(58) Field of Classification Search
CPC .................. G05B 13/0265; G05B 19/4155
(Continued)

(56) References Cited

U.S. PATENT DOCUMENTS

| 6,060,854 A * | 5/2000 | Yutkowitz ............ G05B 19/404 318/574 |
| 2016/0185039 A1* | 6/2016 | Carbone ............... B29C 64/106 425/375 |

(Continued)

FOREIGN PATENT DOCUMENTS

JP 2012-58824 3/2012

*Primary Examiner* — Kenneth M Lo
*Assistant Examiner* — Michael W Choi
(74) *Attorney, Agent, or Firm* — Wenderoth, Lind & Ponack, L.L.P.

(57) ABSTRACT

To provide an adjusting device and an adjusting method for appropriately controlling the machine learning reduced in cost with respect to calculation load and learning period of time in the case where an evaluation program for machine learning is used separately from a machining program and the like. The present invention includes a feedback information acquiring part configured to acquire, from a control device, feedback information obtained when an evaluation program including various types of learning elements is executed in the control device, a determination part configured to determine which learning element the acquired feedback information corresponds to among the various types of learning elements, a feedback information transmitting part configured to transmit the acquired feedback information to a machine learning part corresponding to the learning element, a parameter setting information acquiring part configured to acquire control parameter setting information obtained through machine learning by use of the feedback information, and a parameter setting information transmitting part configured to transmit the acquired control parameter setting information to the control device.

13 Claims, 16 Drawing Sheets

(58) Field of Classification Search
USPC .......................................................... 700/45
See application file for complete search history.

(56) References Cited

U.S. PATENT DOCUMENTS

2017/0032282 A1\* 2/2017 Senoo ..................... G06N 3/006
2019/0227528 A1\* 7/2019 Abbott ............... G05B 13/0265

\* cited by examiner

CONTROL PARAMETER ADJUSTING DEVICE AND ADJUSTING METHOD USING MACHINE LEARNING

This application is based on and claims the benefit of priority from Japanese Patent Application No. 2018-077686, filed on 13 Apr. 2018, the content of which is incorporated herein by reference.

BACKGROUND OF THE INVENTION

Field of the Invention

The present invention relates to an adjusting device for controlling a control device for controlling a motor for driving at least two axes and controlling a machine learning device for performing machine learning to the control device, and an adjusting method thereof.

Related Art

Conventionally, operating characteristics of an apparatus having a driving part such as a machine tool, a robot, and an industrial machine have been learned through machine learning. Control based on the learning result obtained through the machine learning is performed, whereby these apparatuses are enabled to be more appropriately controlled. Patent Document 1 discloses the technique for performing leaning control based on the error between a position command and the position feedback information of a servo motor detected at sampling cycles in the control system for performing machining in a machining shape of a circular arc, a polygon, or a combination of these.

Patent Document 1: Japanese Unexamined Patent Application, Publication No. 2012-58824

SUMMARY OF THE INVENTION

In a conventional machine learning, a machining program for evaluation (hereinafter, also referred to as "evaluation program") for machining a workpiece including a plurality of characteristic machining elements (hereinafter, also referred to as "learning elements"), for example, a circular arc, a polygon and the like) is used to perform machine learning of one learning model. In the case where a plurality of characteristic machining elements are learned on the basis of one learning model, the number of parameters is large. Accordingly, such a learning model is complicated, and such learning requires, for example, a large calculation load, a long learning period of time, and a large memory.

The present invention has been made in view of such circumstances. The object of the present invention is to provide an adjusting device and an adjusting method thereof for controlling the machine learning device including machine learning parts each for learning a learning element corresponding to a characteristic machining element previously set, by switching the machine learning parts to perform learning so that the learning is enabled to be performed on the basis of the corresponding machine learning parts respectively according to the learning elements during learning operation, in the case where one evaluation program for machining a workpiece including the plurality of characteristic machining elements is executed for learning.

(1) The adjusting device (for example, an "adjusting device 300" to be described below) according to the present invention is configured to control a control device (for example, a "CNC device 100" to be described below) configured to control a motor configured to drive at least two axes and control a machine learning device (for example, a "machine learning device 200" to be described below) having a plurality of machine learning parts (for example, a "machine learning parts 210" to be described below) configured to perform machine learning to the control device. The adjusting device includes a startup command output part (for example, a "startup command output part 304" to be described below) configured to output a startup command to start the machine learning part, a feedback information acquiring part (for example, a "feedback information acquiring part 308" to be described below) configured to acquire, from the control device, feedback information obtained when an evaluation program including a plurality of learning elements is executed in the control device, a determination part (for example, a "determination part 3122" to be described below) configured to determine which learning element the acquired feedback information corresponds to among the various types of learning elements, a feedback information transmitting part (for example, a "feedback information transmitting part 301" to be described below) configured to transmit the acquired feedback information to the machine learning part corresponding to the learning element, a parameter setting information acquiring part (for example, a "parameter setting information acquiring part 302" to be described below) configured to acquire, from the machine learning part, control parameter setting information obtained through the machine learning by use of the feedback information, and a parameter setting information transmitting part (for example, a "parameter setting information transmitting part 309" to be described below) configured to transmit the acquired control parameter setting information to an acquisition source of the feedback information of the control device.

(2) The adjusting device according to (1) may include a storage part (for example, an "evaluation program storage part 305" to be described below) configured to store the evaluation program, and an evaluation program output part (for example, an "evaluation program output part 306" to be described below) configured to output the evaluation program to the control device.

(3) The adjusting device according to (1) or (2) may include an evaluation program execution command output part (for example, an "evaluation program execution command output part 307" to be described below) configured to transmit an execution command to execute the evaluation program to the control device.

(4) In the adjusting device according to (1) to (3), when the motor drives the at least two axes, the feedback information acquiring part may acquire the feedback information from the control device, and may transmit the acquired feedback information to the machine learning part corresponding to the feedback information.

(5) In the adjusting device according to (1) to (4), the feedback information may include at least one of a position command, a position feedback, and a positional error.

(6) In the adjusting device according to (5), the feedback information may further include at least one of a speed command, a speed feedback, and a speed error.

(7) In the adjusting device according to (5) or (6), the feedback information may further include at least one of a current command, a current feedback, and a current error.

(8) In the adjusting device according to (5) to (7), the feedback information may further include backlash compensation.

(9) In the adjusting device according to (1) to (8), the machine learning may be reinforcement learning, and the feedback information acquiring part may acquire the feedback information as state information from the control device. The adjusting device may include a parameter correction information transmitting part (for example, a "parameter correction information transmitting part 310" to be described below) configured to transmit control parameter correction information obtained from the machine learning part as action information to the control device.

(10) In the adjusting device according to (1) to (9), the control device may include a plurality of position feedforward calculation parts, a plurality of speed feedforward calculation parts, a plurality of current feedforward calculation parts and a plurality of backlash compensating parts. In at least one of the plurality of position feedforward calculation parts, the plurality of speed feedforward calculation parts, the plurality of current feedforward calculation parts and the plurality of backlash compensating parts, a control parameter may be set or updated by the control parameter setting information acquired from the machine learning part corresponding to the at least one.

(11) The adjusting device according to (1) to (10) may include the machine learning device.

(12) The adjusting device according to (1) to (10) may be included in the machine learning device.

(13) In the adjusting device according to (1) to (10), the control device may include the machine learning device.

(14) The adjusting device according to (1) to (10) may be included in the control device, and may further include the machine learning device.

(15) The adjusting device according to (1) to (10) may be included in the machine learning device, and the machine learning device may be included in the control device.

(16) An adjusting method according to the present invention of an adjusting device controls a control device configured to control a motor configured to drive at least two axes, and controls a machine learning device having a plurality of machine learning parts configured to perform machine learning to the control device. The adjusting method includes the steps of starting the machine learning part, acquiring, from the control device, feedback information obtained when an evaluation program including various types of learning elements is executed in the control device, determining which learning element the acquired feedback information corresponds to among the various types of learning elements, transmitting the acquired feedback information to the machine learning part corresponding to the learning element, acquiring, from the machine learning part, control parameter setting information obtained through the machine learning by use of the feedback information, and transmitting the acquired control parameter setting information to the control device.

According to the present invention, in the case where one evaluation program for machining a workpiece including a plurality of characteristic machining elements is executed for learning, the machine learning device including the machine learning parts each for learning a learning element corresponding to a characteristic machining element is controlled to perform learning by switching the machine learning parts corresponding to the machining elements according to the characteristic machining elements during single learning operation, so as to perform the learning on the basis of the corresponding machine learning parts respectively according to the learning elements during single learning operation. In this manner, during the single learning operation in which one evaluation program is executed, all of the learning elements included in the evaluation program are enabled to be subjected to simultaneous learning based on respective learning models, and further the learning optimal to each of the learning elements is able to be performed.

DETAILED DESCRIPTION OF THE INVENTION

Some embodiments of the present invention will be described below in detail with reference to the drawings.

First Embodiment

Figure 1:
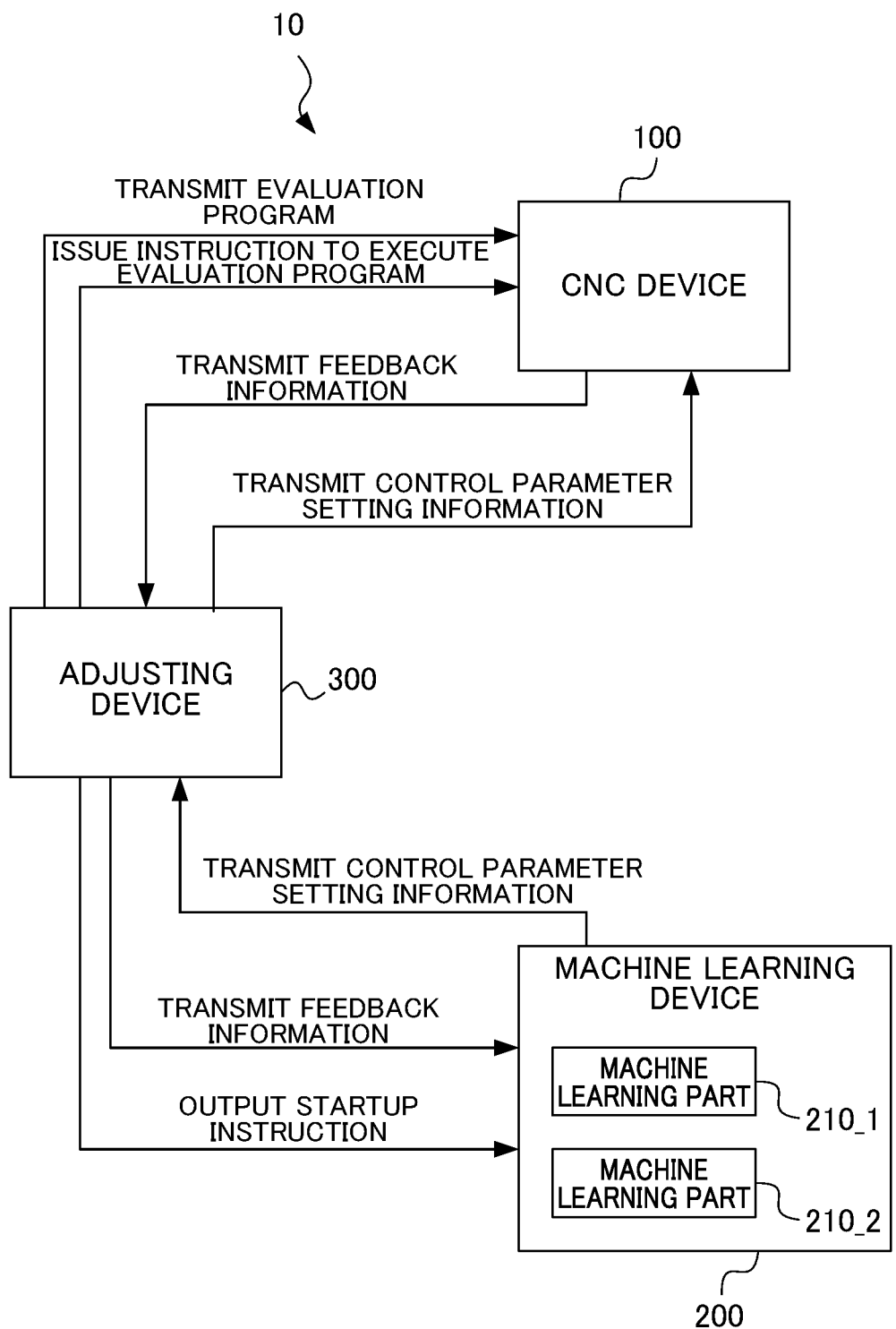
FIG. 1 is a block diagram illustrating an adjusting system according to a first embodiment of the present invention.

FIG. 1 is a block diagram illustrating an adjusting system according to the first embodiment of the present invention. As shown in FIG. 1, the adjusting system 10 includes the CNC (computerized Numerical Control) device 100, the machine learning device 200, and the adjusting device 300. In the present embodiment, the CNC device 100 and the machine learning device 200 are disposed in a one-to-one pair so as to be communicably connected via the adjusting device 300. More specifically, the adjusting device 300 and the CNC device 100, and the adjusting device 300 and the machine learning device 200 are respectively directly connected via connection interfaces, or are respectively connected via networks, thereby enabling to perform mutual communication. It is noted that the network is configured with, for example, a LAN (Local Area Network) built in a factory, the Internet, a public telephone network, or a combination of these. The present invention is not specifically limited to a specific communication method in a network, connection by wired connection or wireless connection, or the like.

Figure 3:
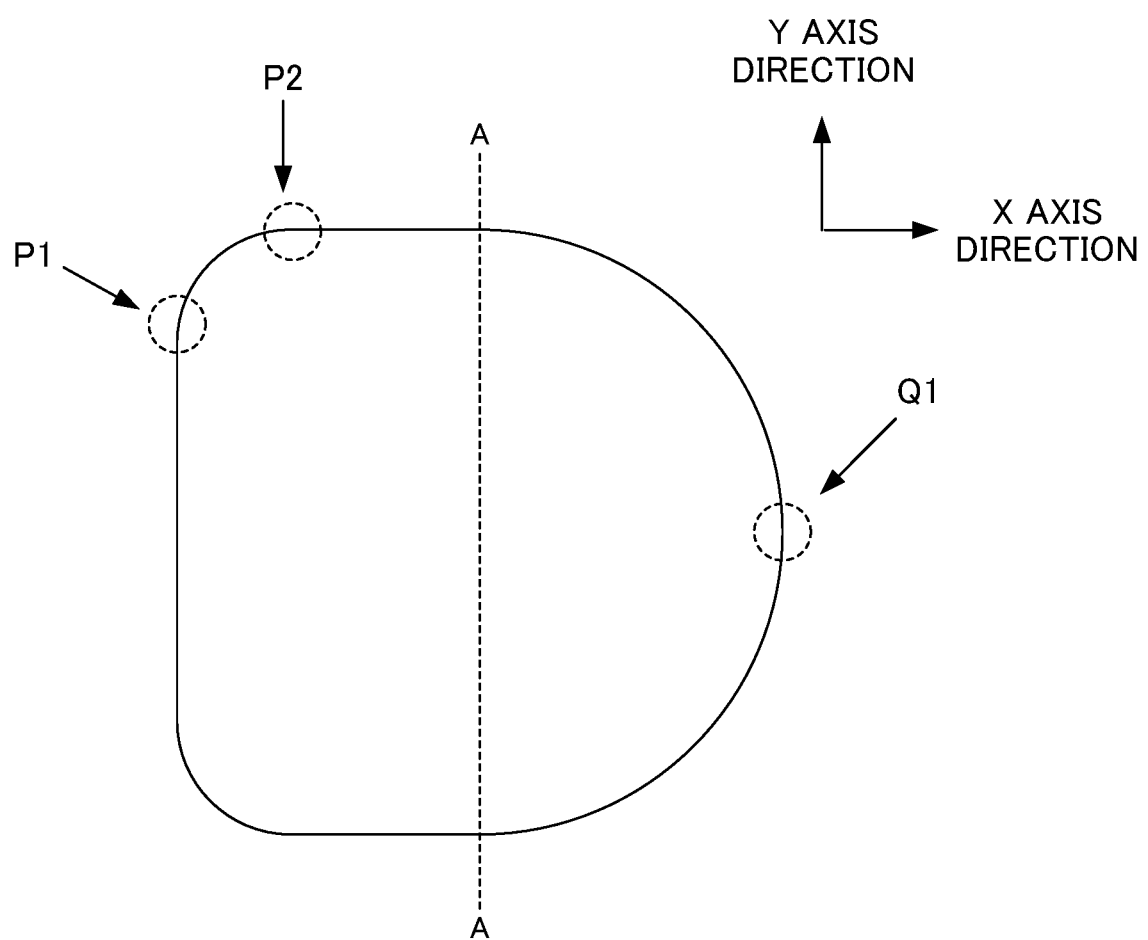
FIG. 3 is a diagram illustrating an example of a machining shape according to the first embodiment of the present invention.

In the first embodiment, an evaluation program including two learning elements as shown in FIG. 3 is used as a plurality of learning elements of the present invention. The machining workpiece shown in FIG. 3 has a shape having the combination of an R-shaped square on the left side of a dotted line A-A and a part of a circular arc on the right side of the dotted line A-A.

As shown in FIG. 3, the operation of a servo motor for moving a table in the X axis direction is shifted from stopping to rotating at a position P1, whereby the motion of the table is shifted from linear motion in the Y axis direction to arc-like motion. At a position P2, the operation of a servo motor for moving the table in the Y axis direction is shifted from rotating to stopping, whereby the motion of the table is shifted from arc-like motion to linear motion in the X axis direction.

As shown in FIG. 3, the rotation direction of the servo motor for moving the table in the X axis direction is inverted at a position Q1, whereby the table moves so as to be inverted linearly in the X axis direction.

That is, the workpiece shown in FIG. 3 includes two different types of machining elements which are the machining element including the position P1 and the position P2 (hereinafter, also referred to as "the machining element to which the rotation speed is changed linearly" and "the first machining element"), and the machining element including the position Q1 (hereinafter, also referred to as "the machining element to which the rotation speed is changed nonlinearly" and "the second machining element").

In the present embodiment, a first learning and a second learning are performed. The object of the first learning is to perform optimal compensation to a speed command at the time when the rotation speed is linearly changed with respect to the machining element (the first machining element) including the position P1 and the position P2. The object of the second learning is to perform optimal compensation to a speed command at the time when inertia (so-called "protrusion") occurs in the case where the rotation direction is inverted with respect to the machining element (the second machining element) including the position Q1 (in order to suppress such protrusion). Therefore, in the present embodiment, the machine learning device has the machine learning parts corresponding to the respective machining elements, and the CNC device has compensating parts for the respective machining elements. In addition, each of the compensating parts performs compensation to a speed command by use of the control parameters generated when the corresponding machine learning part performs learning. The learning will be described in detail below.

The next description is about the respective configurations of the CNC device 100 serving as a control device, the machine learning device 200, and the adjusting device 300. Although in the description below the machine learning device 200 performs reinforcement learning with respect to the control parameters of the CNC device 100, the present invention is not limited thereto.

<CNC Device 100>

Figure 2:
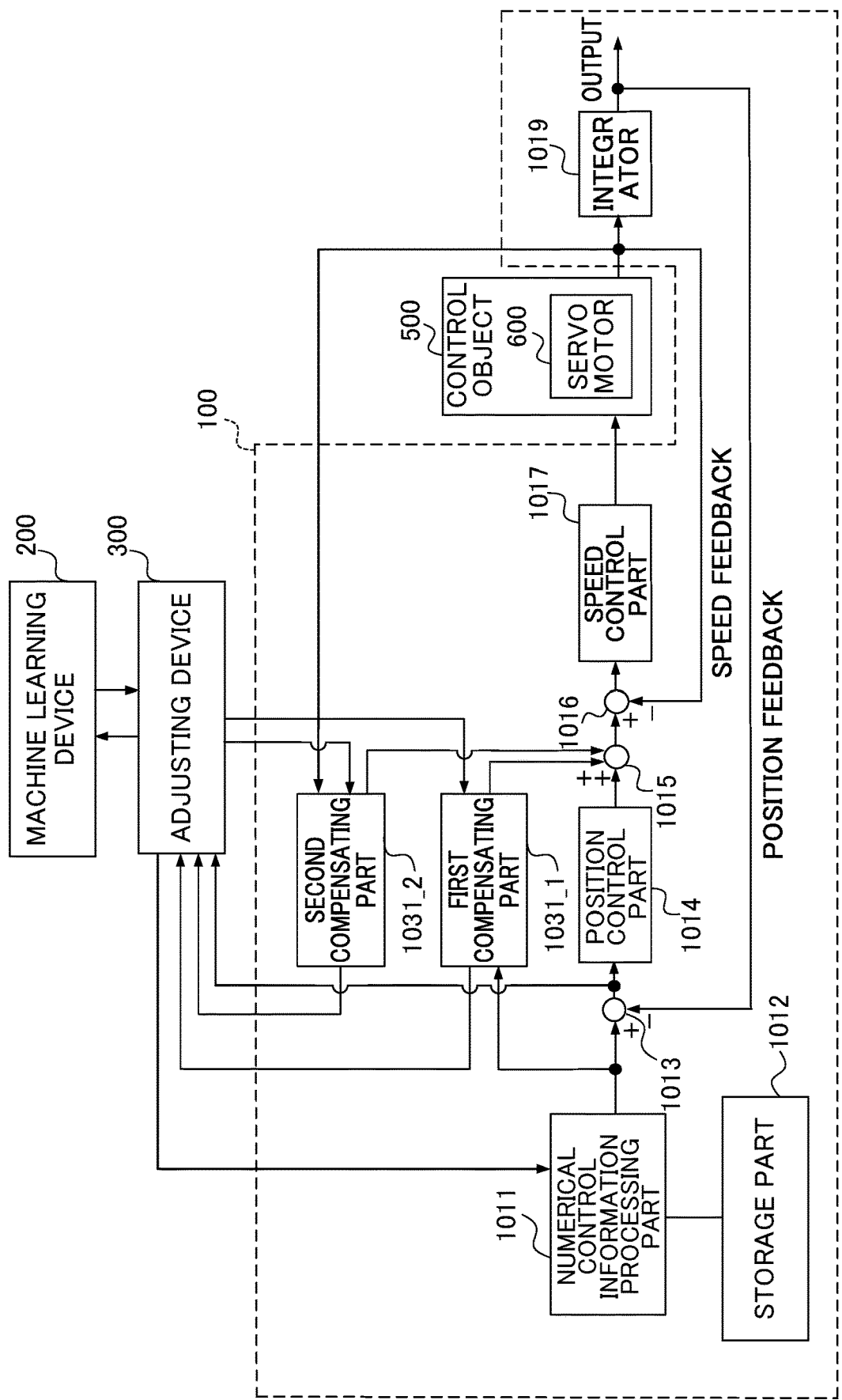
FIG. 2 is a block diagram illustrating one example of configuration of a CNC device 100.

FIG. 2 is a block diagram illustrating one example of configuration of the CNC device. For convenience of explanation, FIG. 2 further shows the adjusting device 300 and the machine learning device 200. Although in the present example the CNC device 100 includes a servo control part, the present invention is not limited thereto. A separate servo control device may be disposed instead of a servo control part.

As shown in FIG. 2, the CNC device 100 controls a servo motor 600 of a control object 500. In the case where two axes or more are to be controlled, the number of the servo motors 600 to be disposed is identical to the number of the axes. In the present embodiment, since the evaluation program operates at least two axes, at least two servo motors are disposed. In the present embodiment, a servo motor serves as a motor. Alternatively, another motor such as a spindle motor may be used. The control object 500 is, for example, a servo motor, or a machine tool, a robot or an industrial machine including a servo motor. The CNC device 100 may be disposed as a part of a machine tool, a robot, an industrial machine, or the like. In the example case described below, the control object 500 is a machine tool including a servo motor.

As shown in FIG. 2, the CNC device 100 includes a numerical control information processing part 1011, a storage part 1012, a subtracter 1013, a position control part 1014, an adder 1015, a subtracter 1016, a speed control part 1017, an integrator 1019, a first compensating part 1031_1 and a second compensating part 1031_2. Each component in the CNC device 100 except for the numerical control information processing part 1011 and the storage part 1012 is disposed for each servo motor. The first compensating part 1031_1 corresponds to the machining element (the first machining element) to which the rotation speed is changed linearly, while the second compensating part 1031_2 corresponds to the machining element (the second machining element) to which the rotation speed is changed nonlinearly.

The storage part 1012 stores an evaluation program, and the evaluation program is a machining program to be used in the CNC device 100 in learning by the machine learning device 200. The evaluation program is provided separately from the machining program to be used in actual machining such as cutting. The evaluation program performs evaluation while machining a workpiece, and may perform evaluation also in the case including air cutting. The evaluation program is transmitted from the adjusting device 300 to be described below to the numerical control information processing part 1011, and the numerical control information processing part 1011 stores the evaluation program in the storage part 1012.

The numerical control information processing part 1011 reads out the evaluation program from the storage part 1012 on the basis of the execution command transmitted by the adjusting device 300 to be described below, and executes the evaluation program. This manner allows the numerical control information processing part 1011 to calculate a position command value on the basis of the code included in the evaluation program, and to output it to the subtracter 1013. The numerical control information processing part 1011 sets a feed rate and calculates a position command value, so as to form the machining shape specified by the evaluation program.

The subtracter 1013 receives the position command value from the numerical control information processing part 1011, calculates a difference between the position command value and the fed-back detected position value, and outputs the difference as a positional error to the position control part 1014 and further transmits the difference to the adjusting device 300 to be described below.

The position control part 1014 outputs a value obtained by multiplying the positional error by a position gain Kp, to the adder 1015 as a speed command value.

The first compensating part 1031_1 performs the compensation amount calculation processing indicated by, for example, a transfer function Gf(s) indicated as a formula 1 (hereinafter, referred to as math. 1), and outputs the resultant compensation amount (hereinafter, also referred to as "first compensation amount") to the adder 1015. The first compensating part 1031_1 is the compensating part corresponding to the first machining element. Accordingly, the first compensating part 1031_1 calculates the compensation amount when the machining related to the first machining element is performed.

$$Gf(s) = \frac{b_{10} + b_{11}s + b_{12}s^2 + \ldots}{a_{10} + a_{11}s + a_{12}s^2 + \ldots}$$ [Math. 1]

In the first embodiment, in the case where the dimension in the transfer function Gf(s) is set to a value set previously, machine learning is performed so as to optimize each of a coefficient $a_{1i}$ and a coefficient $b_{1j}$ ($0 \le i, j \le n$). Hereinafter, the coefficients $a_{1i}$, $b_{1j}$ are also referred to as control parameters of the CNC device 100. It is noted that the first compensating part 1031_1 corresponds to a position feedforward calculation part in a general CNC device.

The second compensating part 1031_2 performs the compensation amount calculation processing indicated by the same transfer function Gf(s) with different coefficients, indicated as, for example, a formula 2 (hereinafter, referred to as math. 2), and outputs the resultant compensation amount (hereinafter, also referred to as "second compensation amount") to the adder 1015. The second compensating part 1031_2 is the compensating part corresponding to the second machining element. Accordingly, the second compensating part 1031_2 calculates the compensation amount when the machining related to the second machining element is performed.

$$Gf(s) = \frac{b_{20} + b_{21}s + b_{22}s^2 + \ldots}{a_{20} + a_{21}s + a_{22}s^2 + \ldots}$$ [Math. 2]

Similarly to the coefficients in the transfer function Gf(s) to be used in the first compensating part 1031_1, in the case where the dimension in the transfer function Gf(s) is set to a value set previously, machine learning is performed so as to optimize each of a coefficient $a_{2i}$ and a coefficient $b_{2j}$ ($0 \le i, j \le n$). Hereinafter, the coefficients $a_{2i}$, $b_{2j}$ are also referred to as control parameters of the CNC device 100. It is noted that the second compensating part 1031_2 corresponds to a backlash compensating part in a general CNC device.

The adder 1015 adds the speed command value and the output value of the first compensating part 1031_1 or the second compensating part 1031_2, and outputs the resultant value as a compensated speed command value to the subtracter 1016. The subtracter 1016 obtains a difference between the output of the adder 1015 and a fed-back detected speed value, and outputs the difference as a speed error to the speed control part 1017.

The speed control part 1017 adds a value obtained through integration after multiplying the speed error by an integral gain K1v and a value obtained by multiplying the speed error by a proportional gain K2v, and outputs the resultant value as a torque command value to the servo motor 600.

The rotational angle position of the servo motor 600 of the control object 500 is detected by a rotary encoder which is associated with the servo motor 600 and serves as a position detecting part. The detected signal is used as a fed-back detected speed value. The detected speed value is integrated by the integrator 1019, and the resultant value is used as a fed-back detected position value. The CNC device 100 is configured as described above.

<Machine Learning Device 200>

The next description is about the machine learning device 200 according to the first embodiment. As described above, the machine learning device 200 includes two units of a machine learning part 210_1 and a machine learning part 210_2. The machine learning part 210_1 performs reinforcement learning of the control parameters $a_{1i}$, $b_{1i}$ ($0 \le i \le n$) related to the transfer function in the first compensating part 1031_1 indicated as [math. 1]. The machine learning part 210_2 performs reinforcement learning of a control parameter $a_{2j}$ and a control parameter $b_{2j}$ ($0 \le j \le n$) related to the transfer function in the second compensating part 1031_2 indicated as [math. 2]. That is, the machine learning part 210_1 corresponds to the first compensating part 1031_1 included in the CNC device 100, while the machine learning part 210_2 corresponds to the second compensating part 1031_2.

The machine learning part 210_1 performs Q-learning, in which a servo state such as commands and feedback signals is defined as a state S, including the values of the control parameters $a_{1i}$, $b_{1i}$ related to the transfer function in the first compensating part 1031_1 indicated as [math. 1] and the positional error information of the CNC device 100 acquired upon the execution of the evaluation program, and in which the adjustment of the control parameters $a_{1i}$, $b_{1i}$ related to the state S is defined as an action A. Similarly, the machine learning part 210_2 performs Q-learning, in which a servo state such as commands and feedback signals is defined as a state S, including the values of the control parameters $a_{2j}$, $b_{2j}$ related to the transfer function in the second compensating part 1031_2 indicated as [math. 2] and the positional error information of the CNC device 100 acquired upon the execution of the evaluation program, and in which the adjustment of the control parameters $a_{2j}$, $b_{2j}$ related to the state S is defined as an action A. As known well to those skilled in the art, the object of the Q-learning is to select, under a certain state S, the action A having a highest value Q(S, A) as the optimal action from among possible actions A.

Specifically, an agent (machine learning device) takes, while selecting various actions A under a certain state S, a better selection of an action on the basis of the rewards given at the time to the actions A, and thereby learns a right value Q(S, A).

The total reward to be obtainable in the future is expected to be maximized, and thus an equitation: $Q(S, A)=E[\Sigma(\gamma^t) r_t]$ is to be satisfied. In the above equitation, E [ ] denotes an expected value, t denotes time, γ denotes a parameter called a discount factor to be described below, $r_t$ denotes a reward at a time t and Σ denotes a sum at the time t. An expected value in the equitation corresponds to the expected value of the case where a state changes according to an optimal action. An update formula of such a value Q(S, A) is expressed by, for example, a formula 3 (hereinafter, referred to as math. 3) as below.

$$Q(S_{t+1}, A_{t+1}) \leftarrow$$

$$Q(S_t, A_{t+1}) + \alpha\left(r_{t+1} + \gamma \max_{A} Q(S_{t+1}, A) - Q(S_t, A_t)\right)$$

[Math. 3]

In the above math. 3, $S_t$ denotes an environmental state at the time t, and $A_t$ denotes an action at the time t. An action $A_t$ changes a state to $S_{t+1}$. In the above math. 3, $r_{t+1}$ denotes a reward obtained upon the change in the state. A value of a term with "max" is obtained by multiplying by γ the value Q of the case where the action A having the highest value Q known at the time is selected under the state $S_{t+1}$. Herein, γ, called a discount factor, is a parameter satisfying 0<γ≤1. Herein, α, which is a learning coefficient, is set in the range of 0<α≤1. The math. 3 described above expresses the method of updating the value $Q(S_t, A_t)$ of the action $A_t$ under the state $S_t$ on the basis of the obtained reward $r_{t+1}$ as a result of the action $A_t$ performed.

The machine learning part 210_1 determines an action A, by observing state information S including the servo state such as commands and feedback signals, including positional error information of the CNC device 100 obtained by executing the evaluation program set previously, on the basis of the control parameters $a_{1i}$, $b_{1j}$ related to the transfer function in the first compensating part 1031_1 indicated as [math. 1]. The state information corresponds to feedback information. The machine learning part 210_1 receives a reward r each time an action A is performed. Herein, the reward r is set as follows. A negative value is set as a value of the reward, in the case where the state information S is corrected to the state information S' by the action information A, and where the value obtained by calculation based on a predetermined evaluation function from a set of positional errors of the CNC device 100 operated on the basis of the control parameters $a_{1i}$, $b_{1j}$ after the correction related to the state information S' is larger than the value obtained by calculation based on a predetermined evaluation function from a set of positional errors of the CNC device 100 operated on the basis of the control parameters $a_{1i}$, $b_{1j}$ before the correction related to the state information S before being corrected by the action information A.

On the other hand, a positive value is set as a value of the reward, in the case where the value obtained by calculation based on a predetermined evaluation function from the set of positional errors of the CNC device 100 operated on the basis of the control parameters $a_{1i}$, $b_{1j}$ after the correction related to the state information S' after being corrected by the action information A is smaller than the value obtained by calculation based on a predetermined evaluation function from the set of positional errors of the CNC device 100 operated on the basis of the control parameters $a_{1i}$, $b_{1j}$ before the correction related to the state information S before being corrected by the action information A. The set of positional error values herein means the set of positional errors measured within a predetermined range including the position P1 and the position P2 of the above-described machining shape. Examples of the evaluation function include the function for calculating an integrated value of absolute positional error values, the function for calculating an integrated value by weighting absolute positional error values with time, the function for calculating an integrated value of 2n (n is a natural number) raised to absolute positional error values, and the function for calculating a maximum value of absolute positional error values. The present invention is not limited thereto. In the Q-learning, in an example, the machine learning part 210_1 makes a search for the optimal action A by trial and error, so that the total future reward r is maximized. This method allows the machine learning part 210_1 to select the optimal action A (that is, the optimal control parameters $a_{1i}$, $b_{1j}$) with respect to the state information S including the servo state such as commands and feedback signals, including the positional error information of the CNC device 100 obtained by executing the evaluation program set previously, on the basis of the control parameters $a_{1i}$, $b_{1j}$ related to the transfer function in the first compensating part 1031_1. It is noted that the machine learning part 210_2 is understood by replacing the indication of the set of the positional error values for the indication of the set of positional errors measured within a predetermined range including the position Q1 of the above-described machining shape, and thus the detailed description of the machine learning part 210_2 will be omitted.

Figure 4:
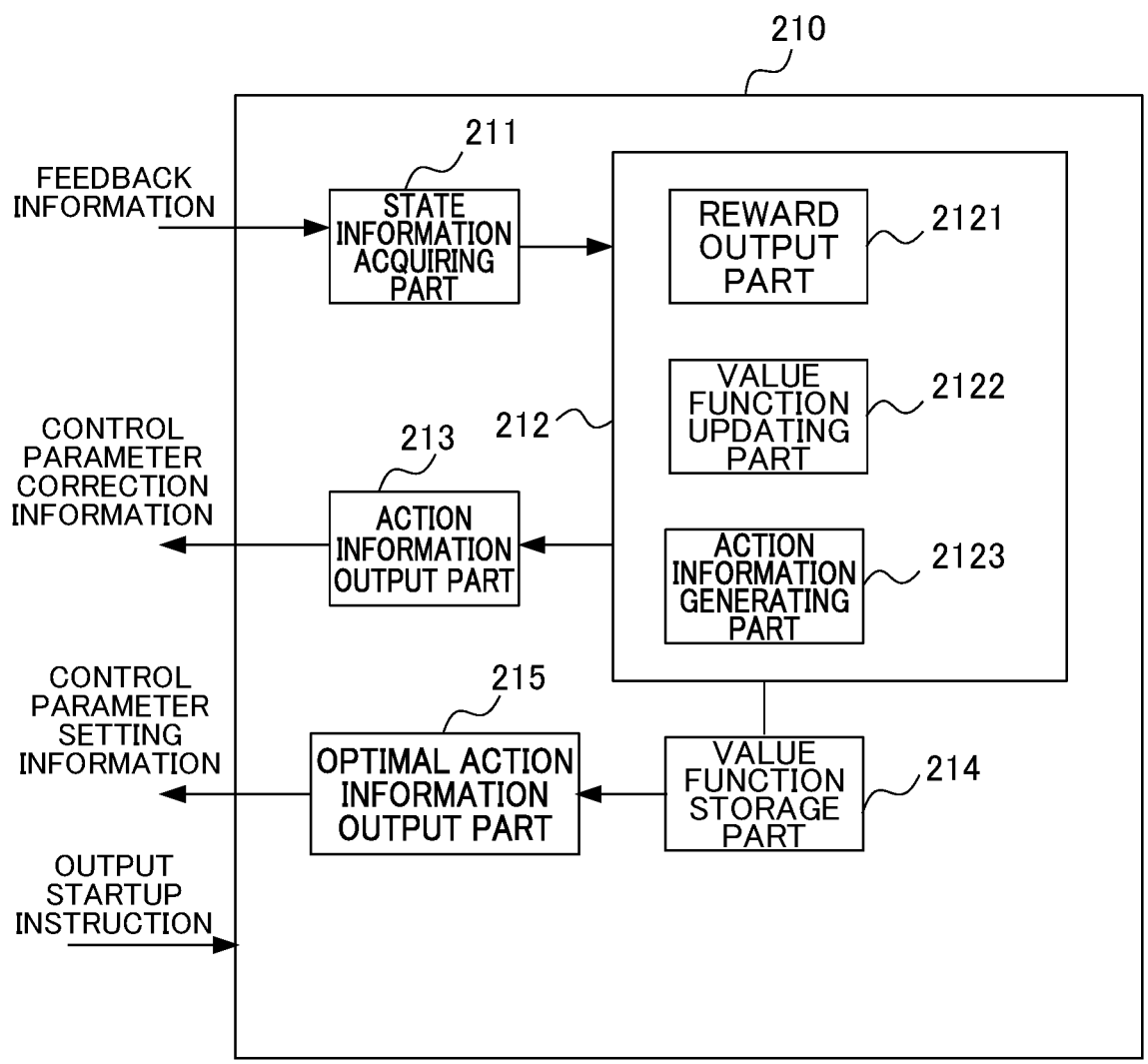
FIG. 4 is a block diagram illustrating a machine learning part 210 included in a machine learning device 200 according to the first embodiment.

FIG. 4 is a block diagram illustrating the functional blocks common to the machine learning part 210_1 or the machine learning part 210_2 according to the first embodiment of the present invention. The machine learning part 210_1 and the machine learning part 210_2 respectively include a state information acquiring part 211_1 and a state information acquiring part 211_2, a learning part 212_1 and a learning part 212_2, an action information output part 213_1 and an action information output part 213_2, a value function storage part 214_1 and a value function storage part 214_2, and an optimal action information output part 215_1 and an optimal action information output part 215_2. The learning part 212_1 and the learning part 212_2 respectively include a reward output part 2121_1 and a reward output part 2121_2, a value function updating part 2122_1 and a value function updating part 2122_2, and an action information generating part 2123_1 and an action information generating part 2123_2. For convenience of explanation, the machine learning part 210_1 or the machine learning part 210_2 is described as the machine learning part 210. Similarly, the state information acquiring part 211_1 or 211_2, the learning part 212_1 or 212_2, the action information output part 213_1 or 213_2, the value function storage part 214_1 or 214_2, the optimal action information output part 215_1 or 215_2, the reward output part 2121_1 or 2121_2, the value function updating part 2122_1 or 2122_2, and the action information generating part 2123_1 or 2123_2 are respectively abbreviated as a state information acquiring part 211, a learning part 212, an action information output part 213, a value function storage part 214, an optimal action information output part 215, a reward output part 2121, a value function updating part 2122, and an action information generating part 2123. As shown in FIG. 4, the machine learning part 210 includes the state information acquiring part 211, the learning part 212, the action information output part 213, the value function storage part 214, and the optimal action information output part 215, in order to perform the reinforcement learning described above. The learning part 212 includes the reward output part 2121, the value function updating part 2122, and the action information generating part 2123.

As described above, the state information acquiring part 211 acquires, from the CNC device 100 via the adjusting device 300 to be described below, the state information S which serves as feedback information and includes the servo state such as commands and feedback signals including the positional error information of the CNC device 100 obtained by executing the evaluation program set previously on the basis of the control parameters $a_{1i}$, $b_{1j}$ related to the transfer function in the first compensating part 1031_1 of the CNC device 100 or the control parameters $a_{2i}$, $b_{2j}$ related to the transfer function in the second compensating part 1031_2. The state information S corresponds to an environmental state S in the Q-learning. The state information acquiring part 211 outputs the acquired state information S to the learning part 212. It is noted that the control parameters $a_{1i}$, $b_{1j}$ related to the transfer function in the first compensating part 1031_1 or the control parameters $a_{2i}$, $b_{2j}$ related to the transfer function in the second compensating part 1031_2 at the time when the Q-learning is initially started are generated by the adjusting device 300 to be described below in advance on the basis of the designation by a user. In the present embodiment, the default values generated by the adjusting device 300 to be described below, of the control parameters $a_{1i}$, $b_{1j}$ related to the transfer function in the first compensating part 1031_1 or the control parameters $a_{2i}$, $b_{2j}$ related to the transfer function in the second compensating part 1031_2 are adjusted to the optimal values through the reinforcement learning. In an example, as for the control parameters $a_{1i}$, $b_{1j}$ or the control parameters $a_{2i}$, $b_{2j}$, default values may be set as $a_{1,0}=a_{2,0}=1$, $a_{1,1}=a_{2,1}=0$, $b_{1,0}=b_{2,0}=0$, $b_{1,1}=b_{2,1}=$ an inertia value of a control object. Further, the dimensions m, n of the coefficients $a_{1i}$, $b_{1j}$ or the coefficients $a_{2i}$, $b_{2j}$ may be set in advance. In an example, as for the coefficients $a_{1i}$ and $a_{2i}$, the dimension m is set as $0 \leq i \leq m$, and as for the coefficients $b_{1j}$ and $b_{2j}$, the dimension n is set as $0 \leq j \leq n$.

The learning part 212 is the unit for learning a value Q(S, A) of the case where a certain action A is selected under a certain environmental state S. Specifically, the learning part 212 includes the reward output part 2121, the value function updating part 2122, and the action information generating part 2123.

As described above, the reward output part 2121 calculates a reward r of the case where an action A is selected under a certain state S.

The value function updating part 2122 performs the Q-learning on the basis of a state S, an action A, a state S' after the action A is applied to the state S, and the reward r obtained through the calculation as described above, thereby updating the value function Q stored by the value function storage part 214. It is noted that the value function Q may be updated by online learning, batch learning, or mini-batch learning. The adjusting device 300 may select any one from among online learning, batch learning, and mini-batch learning. The online learning herein is the learning method in which the value function Q is updated immediately each time the current state S is shifted to a new state S' due to the application of a certain action A to the current state S. The batch learning herein is the learning method in which data for learning is collected through repetition of shifting from the state S to the new state S' due to the application of a certain action A to the current state S, and the value function Q is updated by use of all of the collected data for learning. The mini-batch learning herein is the learning method corresponding to an intermediate method between the online learning and the batch learning, in which the value function Q is updated each time data for learning is accumulated somewhat.

The action information generating part 2123 selects an action A in the step of the Q-learning with respect to a current state S. The action information generating part 2123 generates action information A, so that the action (corresponding to an action A in the Q-learning) of correcting the control parameters $a_{1i}$, $b_{1j}$ related to the transfer function in the first compensating part 1031_1 or the control parameters $a_{2i}$, $b_{2j}$ related to the transfer function in the second compensating part 1031_2 is performed in the step of the Q-learning. The action information generating part 2123 further outputs the generated action information A to the action information output part 213. More specifically, the action information generating part 2123 outputs to the action information output part 213 the action information A to increase or decrease the control parameters $a_{1i}$, $b_{1j}$ related to the transfer function in the first compensating part 1031_1 or the control parameters $a_{2i}$, $b_{2j}$ related to the transfer function in the second compensating part 1031_2 which are included in a state S, in an incremental manner (for example, approx. 0.01). The action information A corresponds to parameter correction information.

In the case where the state is shifted to a state S' due to the application of increase or decrease in the control parameters $a_{1i}$, $b_{1j}$ related to the transfer function in the first compensating part 1031_1 or the control parameters $a_{2i}$, $b_{2j}$ related to the transfer function in the second compensating part 1031_2, and then a positive reward (a reward having a positive value) is returned, the action information generating part 2123 may take a measure to select a next action A' so that the value of the positional error becomes smaller, for example, the action to increase or decrease, in an incremental manner as in the previous action, the control parameters $a_{1i}$, $b_{1j}$ related to the transfer function in the first compensating part 1031_1 or the control parameters $a_{2i}$, $b_{2j}$ related to the transfer function in the second compensating part 1031_2.

Conversely, in the case where a negative reward (a reward having a negative value) is returned, the action information generating part 2123 may take a measure to select a next action A' so that the value of the positional error becomes smaller than the previous value, for example, the action to decrease or increase, in an incremental manner reversely to the previous action, the control parameters $a_{1i}$, $b_{1j}$ related to the transfer function in the first compensating part 1031_1 or the control parameters $a_{2i}$, $b_{2j}$ related to the transfer function in the second compensating part 1031_2.

The action information output part 213 is a unit for transmitting the parameter correction information serving as the action information A output by the learning part 212, to the CNC device 100 via the adjusting device 300 to be described below. As described above, the CNC device 100 finely corrects the current state S, that is, the currently-set control parameters $a_{1i}$, $b_{1j}$ related to the transfer function in the first compensating part 1031_1 or the currently-set control parameters $a_{2i}$, $b_{2j}$ related to the transfer function in the second compensating part 1031_2, on the basis of the action information, whereby the state S is shifted to the next state S' (that is, the corrected control parameters $a_{1i}$, $b_{1j}$ related to the transfer function in the first compensating part

1031_1 or the corrected control parameters $a_{2i}$, $b_{2j}$ related to the transfer function in the second compensating part 1031_2).

The value function storage part 214 is a storage device for storing the value function Q. The value function Q may be stored as a table (hereinafter, referred to as an action-value table) for each state S and each action A, as an example. The value function Q stored in the value function storage part 214 is updated by the value function updating part 2122. Similarly to the action information to be output by the action information output part 213 in the step of the Q-learning, the optimal action information includes the information to correct the control parameters $a_{1i}$, $b_{1j}$ related to the transfer function in the first compensating part 1031_1 or the control parameters $a_{2i}$, $b_{2j}$ related to the transfer function in the second compensating part 1031_2. The information to correct the control parameters $a_{1i}$, $b_{1j}$ related to the transfer function in the first compensating part 1031_1 or the control parameters $a_{2i}$, $b_{2j}$ related to the transfer function in the second compensating part 1031_2 serves as the parameter setting information obtained through the machine learning.

The CNC device 100 corrects the control parameters $a_{1i}$, $b_{1j}$ related to the transfer function in the first compensating part 1031_1 or the control parameters $a_{2i}$, $b_{2j}$ related to the transfer function in the second compensating part 1031_2 on the basis of the parameter correction information, thereby enabling to operate to reduce a positional error value by treating speed feedforward as higher order information. As described above, the machine learning device 200 according to the present invention includes the machine learning part 210_1 and the machine learning part 210_2, thereby enabling to perform the first learning and the second learning during single learning operation. The object of the first learning is to perform optimal compensation to a speed command at the time when rotation speed is linearly changed to the machining element (the first machining element) including the position P1 and the position P2. The object of the second learning is to perform optimal compensation to a speed command at the time when inertia (so-called "protrusion") occurs in the case where the rotation direction is inverted with respect to the machining element (the second machining element) including the position Q1 (in order to suppress such protrusion).

<Adjusting Device 300>

Figure 5A:
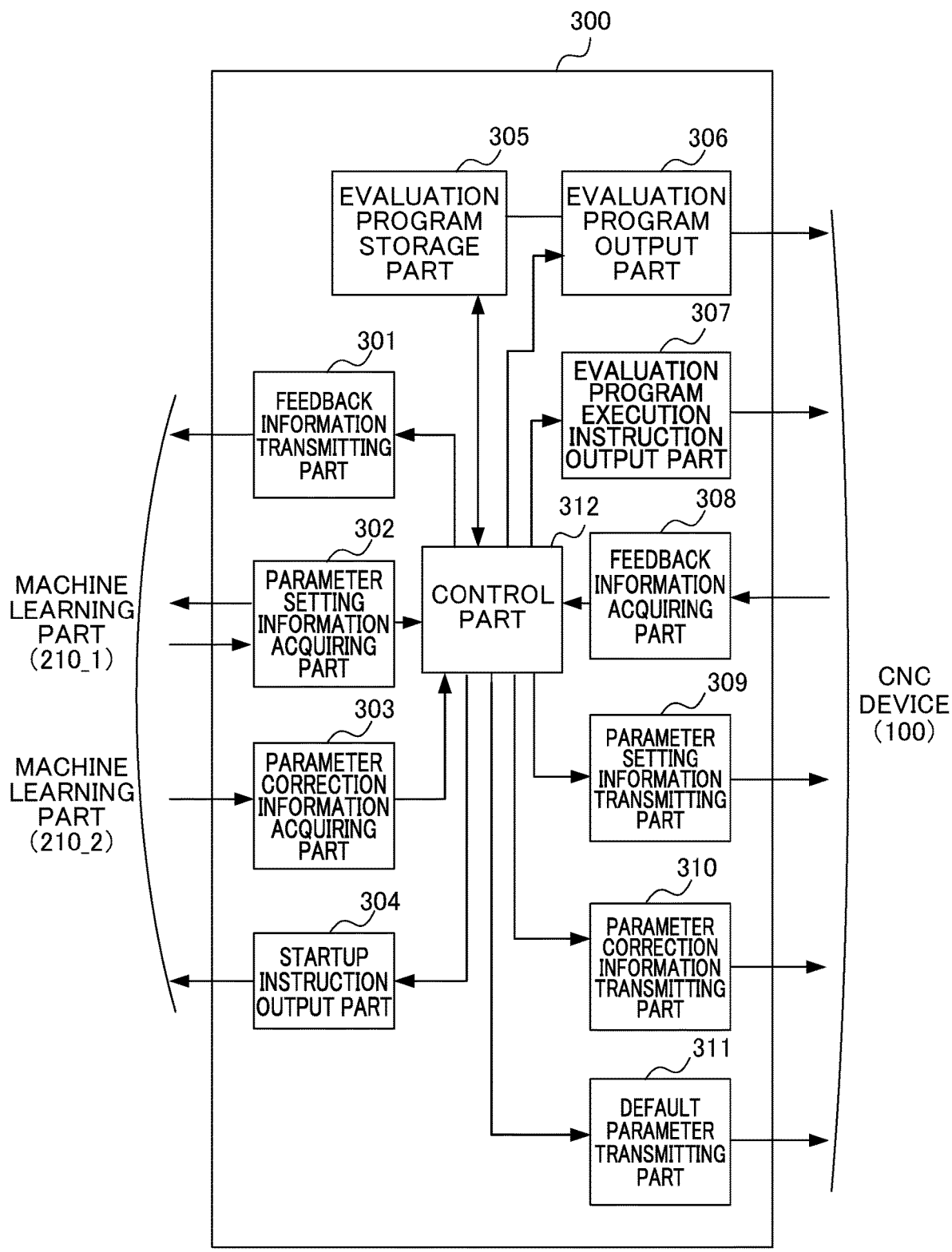
FIG. 5A is a block diagram illustrating one example of configuration of an adjusting device 300 according to the first embodiment.
Figure 5B:
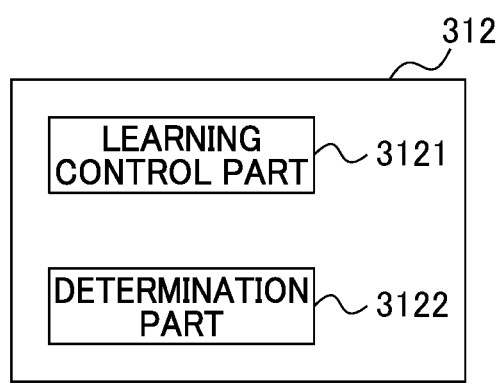
FIG. 5B is a block diagram illustrating one example of configuration of the adjusting device 300 according to the first embodiment.

The next description is about the adjusting device 300 in the first embodiment. FIG. 5A and FIG. 5B are block diagrams illustrating one example of configuration of the adjusting device 300. The adjusting device 300 includes a feedback information transmitting part 301, a parameter setting information acquiring part 302, a parameter correction information acquiring part 303, a startup command output part 304, an evaluation program storage part 305, an evaluation program output part 306, an evaluation program execution command output part 307, a feedback information acquiring part 308, a parameter setting information transmitting part 309, a parameter correction information transmitting part 310, a default parameter transmitting part 311, and a control part 312. Furthermore, the control part 312 includes a learning control part 3121 and a determination part 3122.

The feedback information transmitting part 301, the parameter setting information acquiring part 302, the parameter correction information acquiring part 303 and the startup command output part 304 are the components disposed for the transmission/reception interface with respect to the machine learning device 200. The evaluation program storage part 305, the evaluation program output part 306, the evaluation program execution command output part 307, the feedback information acquiring part 308, the parameter setting information transmitting part 309, the parameter correction information transmitting part 310 and the default parameter transmitting part 311 are the components disposed for the transmission/reception interface with respect to the CNC device 100.

The learning control part 3121 performs control to store an evaluation program in the evaluation program storage part 305, and correction of the stored evaluation program. It is noted that the learning control part 3121 performs control to store an evaluation program in the evaluation program storage part 305, together with the block number of the evaluation program. The learning control part 3121 outputs an evaluation program to the CNC device 100 via the evaluation program output part 306. The learning control part 3121 further transmits a default parameter value to the CNC device 100 via the default parameter transmitting part 311. The learning control part 3121 further outputs a startup command to the machine learning part 210_1 or the machine learning part 210_2 via the startup command output part 304.

The determination part 3122 determines whether the feedback information acquired via the feedback information acquiring part 308 is out of a learning object, or is a learning object to be learned by the machine learning part 210_1 or a learning object to be learned by the machine learning part 210_2. Specifically, on the basis of the current machining position information under operation of the evaluation machining program, the determination part 3122 is able to determine that the feedback information corresponds to a learning object to be learned by the machine learning part 210_1, in the case where the machining position under operation of the evaluation machining program is in a predetermined range including the position P1 and the position P2 of the machining shape described above. The determination part 3122 is further able to determine that the feedback information corresponds to a learning object to be learned by the machine learning part 210_2, in the case where the machining position under operation of the evaluation machining program is in a predetermined range including the position Q1 of the machining shape described above. The determination part 3122 is further able to determine that the feedback information is out of a learning object, in the case where the machining position under operation of the evaluation machining program is located outside the ranges described above. It is noted that, on the basis of, instead of the machining position, the correspondence relation between a block number of an evaluation program and a predetermined range including the position P1 and the position P2 of the machining shape or a predetermined range including the position Q1 of the machining shape, the determination part 3122 may determine that the feedback information corresponds to a learning object to be learned by the machine learning part 210_1, in the case where the current block number under operation of the evaluation machining program corresponds to a predetermined range including the position P1 and the position P2 of the machining shape. The determination part 3122 may further determine that the feedback information corresponds to a learning object to be learned by the machine learning part 210_2, in the case where the current block number under operation of the evaluation machining program corresponds to a predetermined range including the position Q1 of the machining shape. The determination part 3122 may further determine that the feedback information is out of a learning object, in the case where the block number under operation of the evaluation machining program does not correspond to the ranges described above. The learning control part 3121 transmits the destination information indicating that the corresponding machine learning part is the machine learning part 210_1 or the machine learning part 210_2, together with the feedback information to the feedback information transmitting part 301, on the basis of the resultant determination by the determination part 3122. The feedback information transmitting part 301 transmits the feedback information to the machine learning part 210_1 or the machine learning part 210_2 on the basis of the destination information. It is noted that, in the case where the feedback information acquired by the determination part 3122 is out of a learning object, the feedback information transmitting part 301 does not transmit the feedback information to the machine learning part 210_1 or the machine learning part 210_2, and does not execute any machine learning. In this case, the CNC device 100 executes, for example, only feedback processing, without executing any feedforward processing by use of specific parameters.

The control part 312 acquires the parameter setting information together with the information indicating whether the transmission source of the parameter setting information is the machine learning part 210_1 or the machine learning part 210_2, via the parameter setting information acquiring part 302. In the case where the transmission source is the machine learning part 210_1, the determination part 3122 determines that the transmission destination of the parameter setting information is the first compensating part 1031_1. While in the case where the transmission source is the machine learning part 210_2, the determination part 3122 determines that the transmission destination of the parameter setting information is the second compensating part 1031_2. The learning control part 3121 transmits the parameter setting information to the transmission destination determined by the determination part 3122, via the parameter setting information transmitting part 309. It is noted that as described above, in the case where the feedback information acquired by the determination part 3122 is out of a learning object, the learning control part 3121 may not perform any processing in particular.

Similarly, the control part 312 acquires the parameter correction information together with the information indicating whether the transmission source of the parameter correction information is the machine learning part 210_1 or the machine learning part 210_2, via the parameter correction information acquiring part 303. In the case where the transmission source is the machine learning part 210_1, the determination part 3122 determines that the transmission destination of the parameter correction information is the first compensating part 1031_1. While in the case where the transmission source is the machine learning part 210_2, the determination part 3122 determines that the transmission destination of the parameter correction information is the second compensating part 1031_2. The learning control part 3121 transmits the parameter correction information to the transmission destination determined by the determination part 3122, via the parameter correction information transmitting part 310. The configurations of the CNC device 100, the machine learning device 200 and the adjusting device 300 have been described so far.

Figure 6A:
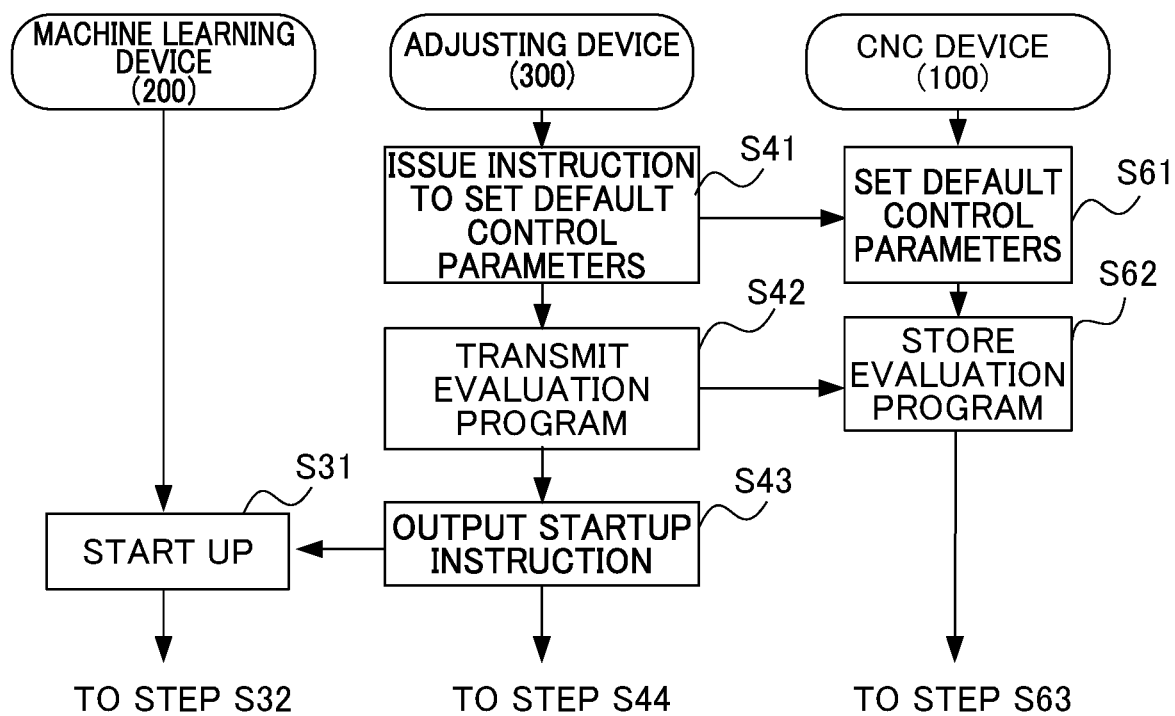
FIG. 6A is a flowchart for explaining a startup operation in an adjusting system 10.
Figure 6B:
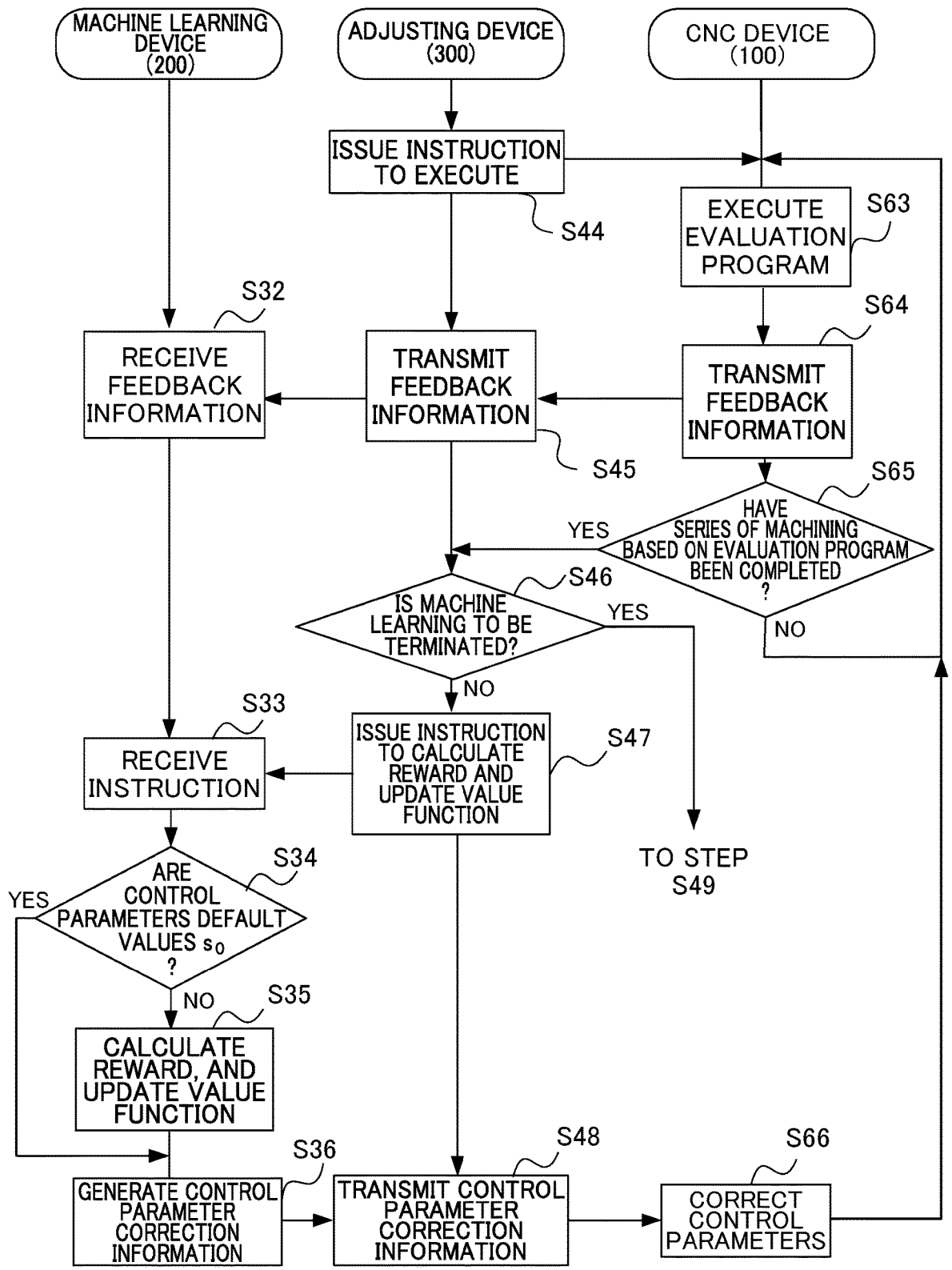
FIG. 6B is a flowchart for explaining a learning operation in the adjusting system 10.
Figure 6C:
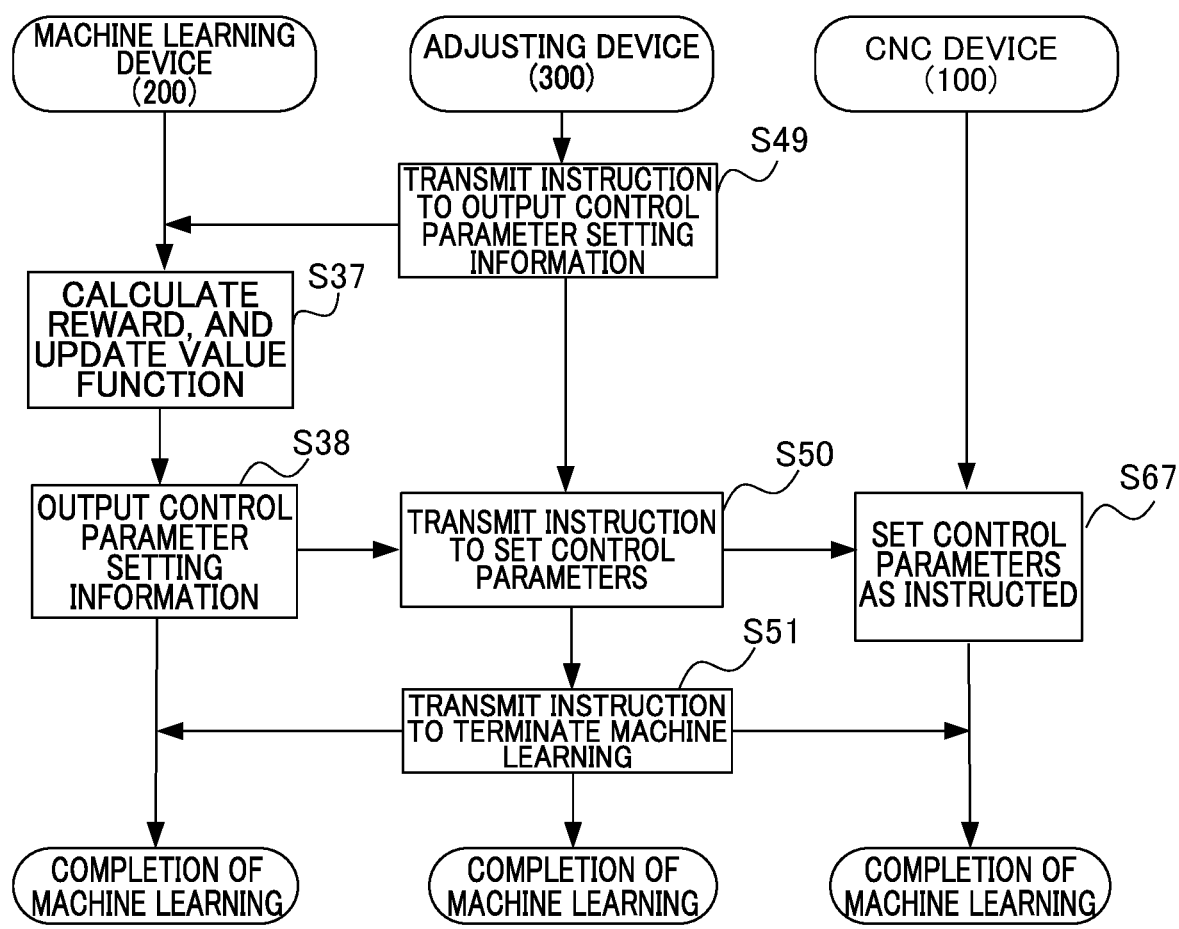
FIG. 6C is a flowchart for explaining an output operation of parameter setting information in the adjusting system 10.

The next description with reference to FIG. 6A, FIG. 6B, and FIG. 6C is about the operation in the adjusting system, mainly about the operation in the adjusting device 300. FIG. 6A is a flowchart indicating the startup operation in the adjusting system. First in step S41, the control part 312 of the adjusting device 300 issues the command to set default control parameters to the CNC device 100, via the default parameter transmitting part 311. Specifically, the control part 312 of the adjusting device 300 issues the command to set default values of the coefficients $a_{1i}$, $b_{1j}$ in the first compensating part 1031_1 as $a_{1,0}=1$, $a_{1,1}=0$, $b_{1,0}=0$, $b_{1,1}=$an inertia value of a control object in the math. 1, and to set the dimensions m, n of the coefficients $a_{1i}$, $b_{1j}$. Similarly, the control part 312 of the adjusting device 300 issues the command to set default values of the coefficients $a_{2i}$, $b_{2j}$ in the second compensating part 1031_2 as $a_{2,0}=1$, $a_{2,1}=0$, $b_{2,0}=0$, $b_{2,1}=$an inertia value of a control object in the math. 2, and to set the dimensions m, n of the coefficients $a_{2i}$, $b_{2j}$. In step S61, the CNC device 100 sets the values and dimensions of the coefficients $a_{1i}$, $b_{1j}$ in the first compensating part 1031-1 and the values and dimensions of the coefficients $a_{2i}$, $b_{2j}$ in the second compensating part 1031-2, on the basis of the command issued by the adjusting device 300.

Next, in step S42, the control part 312 of the adjusting device 300 transmits the evaluation program to the CNC device 100, via the evaluation program output part 306. Specifically, the control part 312 issues the command to transmit the evaluation program, to the evaluation program output part 306. The evaluation program output part 306 reads out the evaluation program from the evaluation program storage part 305, and transmits the evaluation program to the CNC device 100. In step S62, the numerical control information processing part 1011 of the CNC device 100 stores the evaluation program in the storage part 1012.

Next, in step S43, the control part 312 of the adjusting device 300 issues the startup command to the machine learning device 200, via the startup command output part 304. In step S31, the machine learning device 200 is activated upon the reception of the startup command from the adjusting device 300, and thereafter becomes a standby state.

The next description with reference to FIG. 6B is about the learning operation in the adjusting system 10. FIG. 6B is the flowchart indicating the learning operation in the adjusting system 10. In step S44, the control part 312 of the adjusting device 300 issues the command to execute the evaluation program to the numerical control information processing part 1011 of the CNC device 100, via the evaluation program execution command output part 307.

After receiving the execution command from the adjusting device 300, the numerical control information processing part 1011 of the CNC device 100, in step S63, reads out the evaluation program from the storage part 1012 and calculates the position command value on the basis of the evaluation program. The CNC device 100 controls the servo motor 600, and then in step S64, transmits to the adjusting device 300 the values of the coefficients $a_{1i}$, $b_{1j}$ of the transfer function in the first compensating part 1031-1, the values of the coefficients $a_{2i}$, $b_{2j}$ of the transfer function in the second compensating part 1031-2, and the feedback information including the positional error information of the CNC device 100 acquired upon the execution of the evaluation program, together with machining position information under operation of the evaluation machining program or the block number of the evaluation program from which the feedback information comes. The feedback information serves as state information S.

In step S45, the control part 312 of the adjusting device 300 acquires the feedback information together with the block number via the feedback information acquiring part 308, and transmits them via the feedback information transmitting part 301 to the machine learning part 210_1 or the machine learning part 210_2 which corresponds to the machining position information under operation of the evaluation machining program or the block number of the evaluation program. In step S32, the machine learning part 210_1 or the machine learning part 210_2 receives the feedback information.

In step S65, the CNC device 100 determines whether or not the series of machining based on the evaluation program has been completed. The described-above state in which the series of machining based on the evaluation program has been completed means, for example, the state in which the entire of the evaluation program with respect to the machining shape shown in FIG. 3 has been executed. In the case where the series of machining based on the evaluation program has not been completed (NO in step S65), the processing is returned to step S63. In the case where the series of machining based on the evaluation program has been completed (YES in step S65), the adjusting device 300 is notified of that the series of machining based on the evaluation program has been completed.

Upon the reception of the completion notification of the series of machining based on the evaluation program, the control part 312 of the adjusting device 300 records and updates the number of times of receiving the completion notification of the evaluation program. Then, in step S46, the control part 312 of the adjusting device 300 determines whether or not the number of times of the reception exceeds a predetermined number of times, or determines whether or not the learning period of time exceeds a predetermined learning period of time, thereby determining whether to terminate the machine learning. In the case where the machine learning is not to be terminated (NO in step S46), the processing is shifted to step S47. In the case where the machine learning is to be terminated (YES in step S46), the processing is shifted to step S49. In step S47, the adjusting device 300 issues the command to calculate the reward and update the value function, to the machine learning part 210_1 or the machine learning part 210_2 of the machine learning device 200.

After the machine learning part 210_1 or the machine learning part 210_2 of the machine learning device 200 receives, in step S33, the command to calculate the reward and update the value function, the machine learning part 210_1 or the machine learning part 210_2 determines, in step S34, whether or not the control parameters received from the CNC device 100, that is, the values of the respective coefficients $a_{1i}$, $b_{1j}$ of the transfer function in the corresponding first compensating part 1031_1 (the values of the control parameters) or the values of the respective coefficients $a_{2i}$, $b_{2j}$ of the transfer function in the corresponding second compensating part 1031_2 (the values of the control parameters) are default values. In other words, the machine learning part 210_1 or the machine learning part 210_2 determines whether the control parameters are a set of default values (state information) $S_0$, and whether the control parameters are a set of state information S obtained after the set of default values (state information) $S_0$. In the case where the control parameters are the set of the state information S obtained after the default values (state information) $S_0$ and where the control parameters are not the set of default values (state information) $S_0$ (NO in step S34), the processing is shifted to step S35. In the case where the values of the control parameters are the default values (YES in step S34), the processing is shifted to step S36.

In step S35, the machine learning part 210_1 or the machine learning part 210_2 of the machine learning device 200 calculates the reward and updates the value function, and thereafter the processing is shifted to step S36. In step S36, the machine learning part 210_1 or the machine learning part 210_2 of the machine learning device 200 generates the control parameter correction information, and transmits the control parameter correction information to the adjusting device 300. The control parameter correction information described above is, for example, the information to increase or decrease the respective coefficients $a_{1i}$, $b_{1j}$ of the first compensating part 1031_1 or the respective coefficients $a_{2i}$, $b_{2j}$ of the second compensating part 1031_2 which are included in the action A with respect to the coefficients of the first compensating part 1031_1 and the coefficients of the second compensating part 1031_2 included in the state S, in an incremental manner (for example, approx. 0.01).

In step S48, the adjusting device 300 transmits the control parameter correction information received from the machine learning device 200, to the first compensating part 1031_1 corresponding to the machine learning part 210_1 or the second compensation part 1031_2 corresponding to the machine learning part 210_2, of the CNC device 100.

In step S66, the first compensating part 1031_1, upon the reception of the control parameter correction information, corrects the coefficients $a_{1i}$, $b_{1j}$ related to the transfer function in the first compensating part 1031_1, while the second compensating part 1031_2, upon the reception of the control parameter correction information, corrects the coefficients $a_{2i}$, $b_{2j}$ related to the transfer function in the second compensating part 1031_2, and thereafter the processing is returned to step S63. In this way, the CNC device 100 repeatedly performs the series of machining based on the evaluation program, on the basis of the corrected control parameters $a_{1i}$, $b_{1j}$ related to the transfer function in the first compensating part 1031_1, or the corrected control parameters $a_{2i}$, $b_{2j}$ related to the transfer function in the second compensating part 1031_2.

The next description is about the output operation of the control parameter setting information in the adjusting system 10. FIG. 6C is the flowchart indicating the output operation of the control parameter setting information in the adjusting system 10. The output operation of the control parameter setting information is to be performed after the determination made to terminate the machine learning in step S46. The control parameter setting information serves as optimal action information.

As shown in FIG. 6C, in step S49, the control part 312 of the adjusting device 300 transmits the command to output the control parameter setting information, to the machine learning device 200.

When in step S37 the machine learning part 210_1 or the machine learning part 210_2 of the machine learning device 200 receives the command to output the control parameter setting information serving as optimal action information, the machine learning part 210_1 or the machine learning part 210_2 calculates the reward corresponding to the last machine learning, and updates the value function.

In step S38, the machine learning part 210_1 or the machine learning part 210_2 (the optimal action information output part 215) of the machine learning device 200 acquires the value function Q stored in a value function storage part 214, generates the control parameter setting information serving as optimal action information with respect to, for example, the default state $S_0$ on the basis of the acquired value function Q, and outputs the generated control parameter setting information to the adjusting device 300.

In step S50, the adjusting device 300 acquires the control parameter setting information together with the information indicating that the transmission source thereof is the machine learning part 210_1 or the machine learning part 210_2, and thereafter outputs them to the first compensating part 1031_1 or the second compensating part 1031_2 corresponding to the transmission source of the control parameter setting information, of the CNC device 100.

In step S67, the CNC device 100 sets to the optimal values the coefficients $a_{1i}$, $b_{1j}$ related to the transfer function in the first compensating part 1031_1 and the coefficients $a_{2i}$, $b_{2j}$ related to the transfer function in the second compensating part 1031_2 each corresponding to the transmission source of the control parameter setting information, on the basis of the control parameter setting information received from the adjusting device 300.

In step S51, the adjusting device 300 terminates the learning by transmitting the command to terminate the learning to the CNC device 100 and the machine learning device 200. Upon the reception of the command to terminate the learning from the adjusting device 300, the CNC device 100 and the machine learning device 200 terminate the learning.

<Usage of Control Parameter Setting Information>

As described above, the CNC device 100 sets the coefficients $a_{1i}$, $b_{1j}$ of the first compensating part 1031_1, and the coefficients $a_{2i}$, $b_{2j}$ of the second compensating part 1031_2, by use of the learning result by the machine learning part 210_1 of the machine learning device 200. The first compensating part 1031_1 and the second compensating part 1031_2 respectively and individually correspond to the learning elements.

The CNC device 100 includes a determination part (not shown) for determining which learning element the current execution point of the machining program corresponds to among the above-described learning elements when executing the machining program. The CNC device 100 is capable of applying the first compensating part 1031_1 and the second compensating part 1031_2 so as to correspond to a learning element, on the basis of the determination by the determination part.

Although the operations in the CNC device 100, the machine learning device 200 and the adjusting device 300 have been described so far on the basis of the processing flowcharts, the above-described processing flowcharts are merely examples. The present invention is not limited thereto. In order to realize these functions, each of the CNC device 100, the machine learning device 200 and the adjusting device 300 includes an arithmetic processing unit such as a CPU (Central Processing Unit). Each of the CNC device 100, the machine learning device 200 and the adjusting device 300 further includes an auxiliary storage device such as an HDD (Hard Disk Drive) for storing various types of control programs such as application software and OS (Operating System), and a main storage device such as a RAM (Random Access Memory) for storing data temporarily required by the arithmetic processing unit in executing such programs.

In each of the CNC device 100, the machine learning device 200 and the adjusting device 300, the arithmetic processing unit reads application software and/or OS from the auxiliary storage device, develops the read application software and/or the OS in the main storage device, and performs arithmetic processing based on the application software and/or the OS. Various types of hardware included in each device are controlled on the basis of the arithmetic processing result. In this manner, the functional blocks of the present embodiment are realized. That is, the present embodiment is enabled to be realized by the cooperation of hardware and software.

The machine learning device 200 requires a large amount of the arithmetic processing associated with the machine learning. In an example, a technique called GPGPU (General-Purpose computing on Graphics Processing Units) may allow a personal computer equipped with a GPU (Graphics Processing Unit) to perform high-speed processing by use of the GPU for the arithmetic processing associated with the machine learning. In order to perform higher-speed processing, a computer cluster may be constructed with a plurality of computers equipped with such GPUs, so that the plurality of computers included in the computer cluster perform parallel processing.

In the case where one evaluation program for machining a workpiece including a plurality of characteristic machining elements is executed for learning, the adjusting device 300 and the adjusting method performed by the adjusting device 300 according to the first embodiment control the machine learning device including the machine learning parts respectively for learning the learning elements corresponding to characteristic machining elements, to perform learning by switching the machine learning parts corresponding to the machining elements according to the characteristic machining elements during single learning operation, so that the machine learning device is able to perform the learning by the corresponding machine learning parts respectively according to the learning elements during single learning operation. In this manner, during the single learning operation in which one evaluation program is executed, all of the learning elements included in the evaluation program are enabled to be subjected to simultaneous learning based on respective learning models, and further to the learning optimal to each of the learning elements.

It is noted that the numerical control information processing part 1011 is configured to, in the case where an arbitrary machining program is executed when each of the compensating parts (the first compensating part 1031_1 and the second compensating part 1031_2) is optimized after the machine learning, determine whether or not the machining shape currently under machining corresponds to the first machining element or the second machining element, on the basis of the machining position information under operation of the machining program or the block number of the machining program, so that the appropriate compensating parts (the first compensating part 1031_1 and the second compensating part 1031_2) are able to compensate a speed command. In this case, in an example, simulation (idle operation) is performed prior to the execution of the machining program to calculate the machining position information corresponding to the first machining element or the second machining element or the information on the block number of the machining program. By reference to the information, whether or not the machining shape currently under machining corresponds to the first machining element or the second machining element may be determined when the machining program is executed. Alternatively, whether or not the machining shape to be machined corresponds to the first machining element or the second machining element may be determined at the time of pre-reading of the machining program during when the machining program is executed.

In the above embodiment, the CNC device 100 includes two compensating parts which are the first compensating part 1031_1 and the second compensating part 1031_2, and the machine learning device 200 correspondingly has two machine learning parts which are the machine learning part 210_1 and the machine learning part 210_2. It is noted that the present invention is not limited thereto. The CNC device 100 may have an arbitrary number of compensating parts 1031, according to the number of the characteristic machining elements of a workpiece under machining, and the machine learning device 200 may have the corresponding number of machine learning parts 210.

Various modifications with respect to the first embodiment described above are available.

(Modification 1)

In the first embodiment, as shown in FIG. 3, the machining workpiece serving as a learning object includes the characteristic machining elements including an R-shaped square on the left side of the dotted line A-A (a predetermined range including the position P1 and the position P2) and a part of a circular arc on the right side of the dotted line A-A (a predetermined range including the position Q1). The present invention is not limited thereto.

Figure 7:
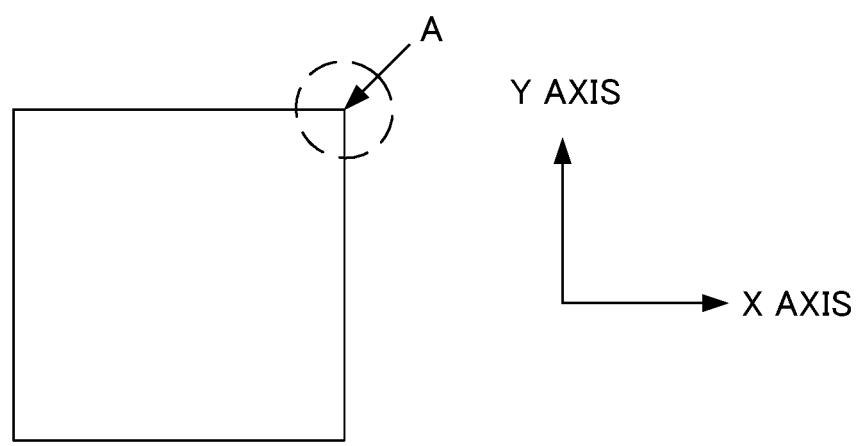
FIG. 7 is a diagram illustrating an example of a machining element according to a modification of the present invention.

FIG. 7 to FIG. 13 respectively show other examples of the characteristic machining elements. FIG. 7 shows the case where the machining shape is a rectangular. In an example, at the corner of a point A shown in FIG. 7, the operation of the servo motor for moving the table in the Y axis direction is shifted from stopping to rotating, while the operation of the servo motor for moving the table in the X axis direction is shifted from rotating to stopping, whereby the motion of the table is shifted from the linear motion in the X axis direction to the linear motion in the Y axis direction.

Figure 8:
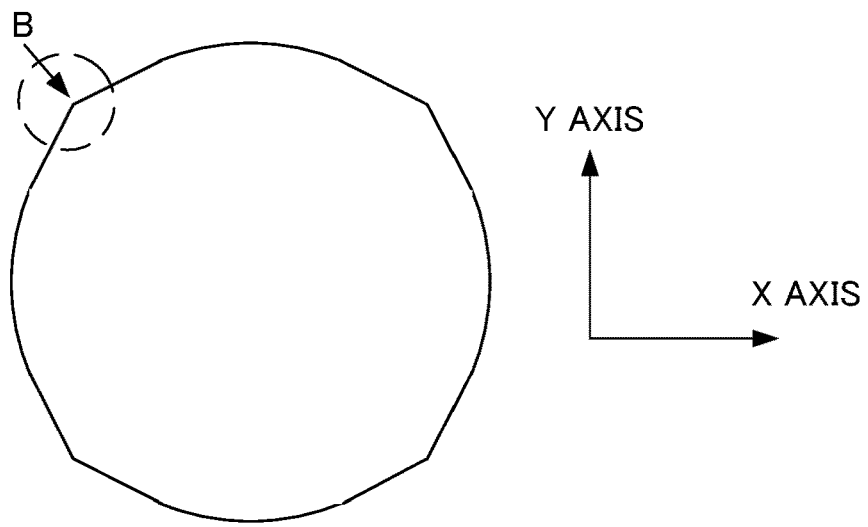
FIG. 8 is a diagram illustrating another example of a machining element according to a modification of the present invention.

FIG. 8 shows the case where the machining shape is the octagonal shape having some corners formed in circular arcs. In an example, at a point B shown in FIG. 8, not only operating characteristics at the time of inverting on the circular arc but also speed are changed discontinuously.

Figure 9:
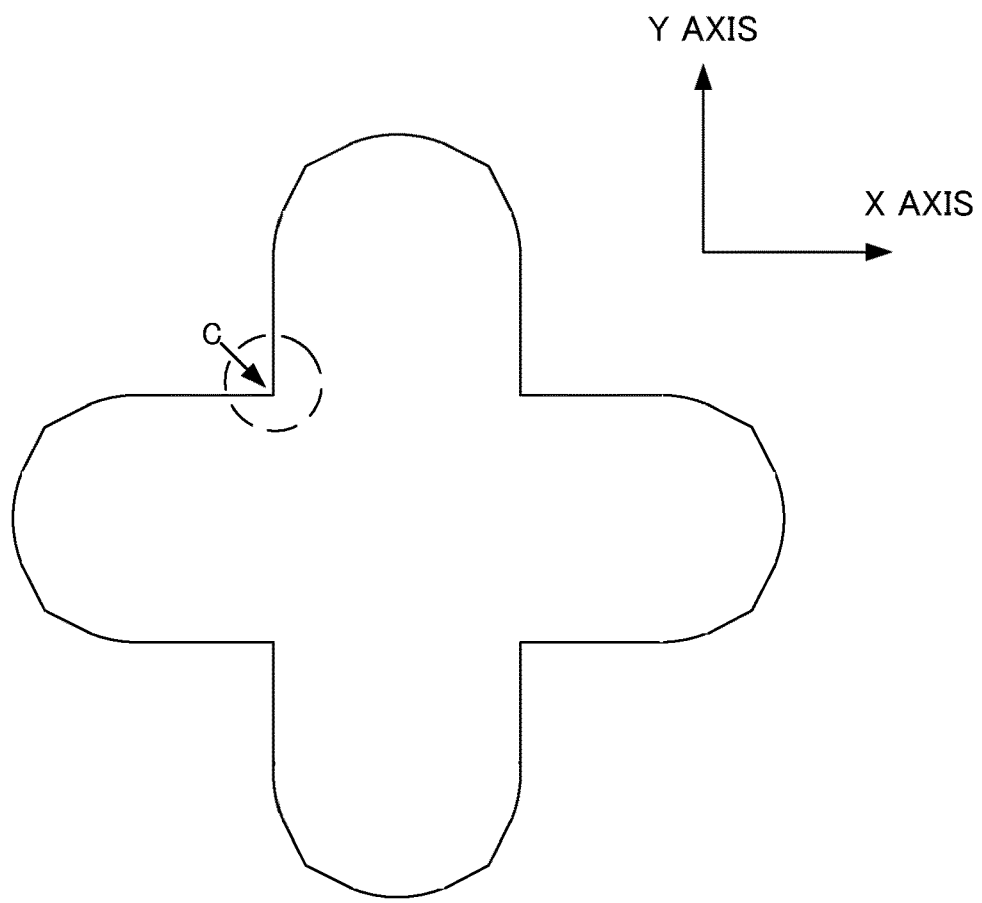
FIG. 9 is a diagram illustrating another example of a machining element according to a modification of the present invention.

FIG. 9 shows the case where the machining shape is the cross shape having the respective ends each formed in the halved octagon having some corners formed in circular arcs. In an example, the operation of the motor for driving the X axis is shifted from reducing in speed to stopping, while the operation of the motor for driving the Y axis is shifted from stopping to rotating, at a point C shown in FIG. 9.

Figure 10:
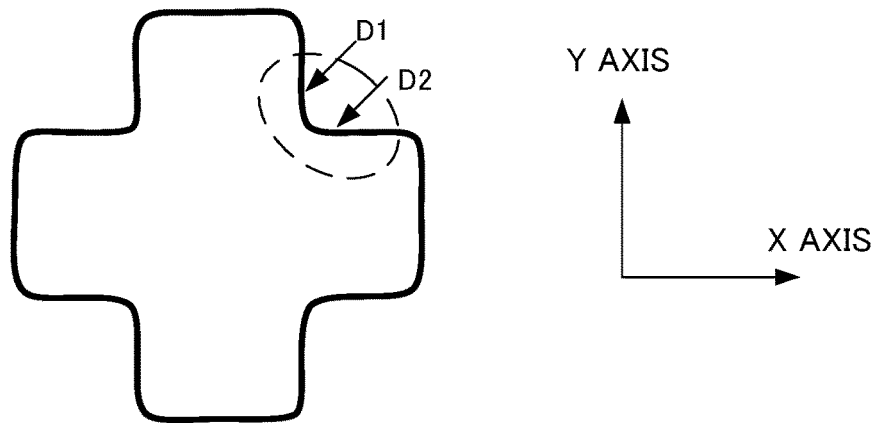
FIG. 10 is a diagram illustrating another example of a machining element according to a modification of the present invention.

FIG. 10 shows the case where the machining shape is the cross shape with R-shaped corners. In an example, at a point D1 shown in FIG. 10, the operation of the motor for driving the X axis is shifted to starting to rotate in the same direction as the direction prior to the stopping. At a point D2, the operation of the motor for driving the Y axis is shifted to stopping, while the motor for driving the X axis is rotating in the same direction as the direction prior to the stopping.

Figure 11:
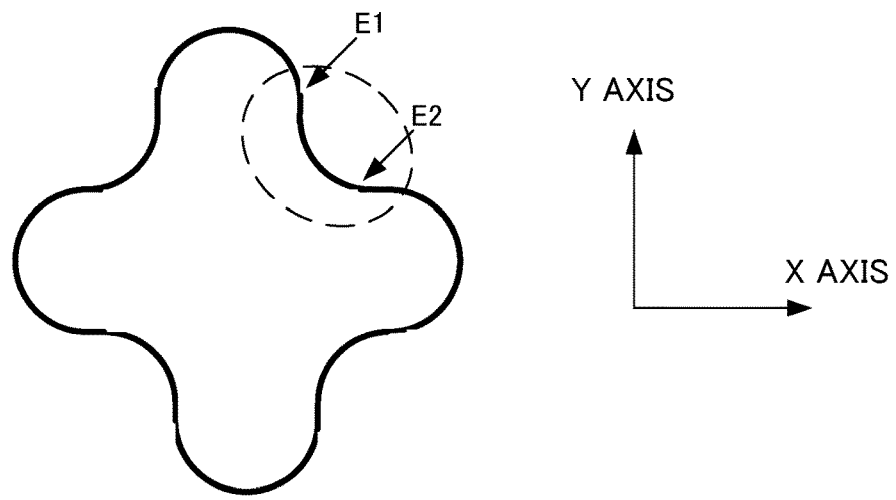
FIG. 11 is a diagram illustrating another example of a machining element according to a modification of the present invention.

FIG. 11 shows the case where the machining shape is the cross shape including convex arcs and concave arcs. In an example, at a point E1 shown in FIG. 11, the motor for driving the X axis starts to rotate in the same direction immediately after stopping in rotation. At a point E2, the motor for driving the Y axis starts to rotate in the same direction immediately after stopping in rotation.

Figure 12:
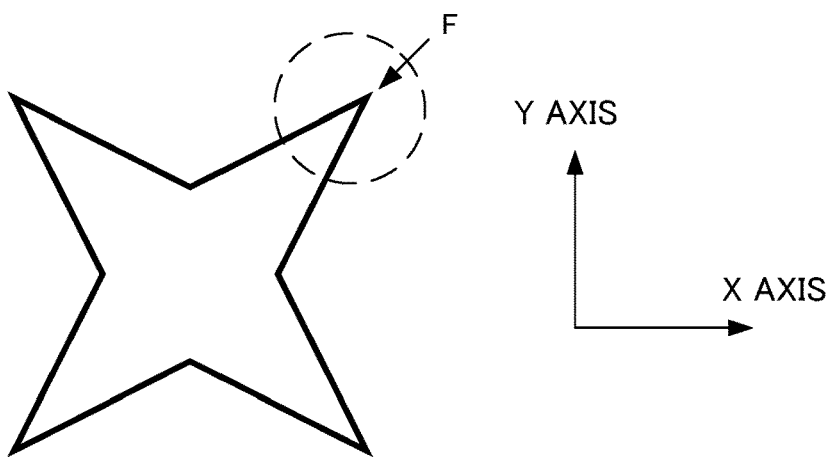
FIG. 12 is a diagram illustrating another example of a machining element according to a modification of the present invention.

FIG. 12 shows the case where the machining shape is a star. In an example, the both of the motor for driving the X axis and the motor for driving the Y axis are inverted in rotation directions at a point F shown in FIG. 13.

Figure 13:
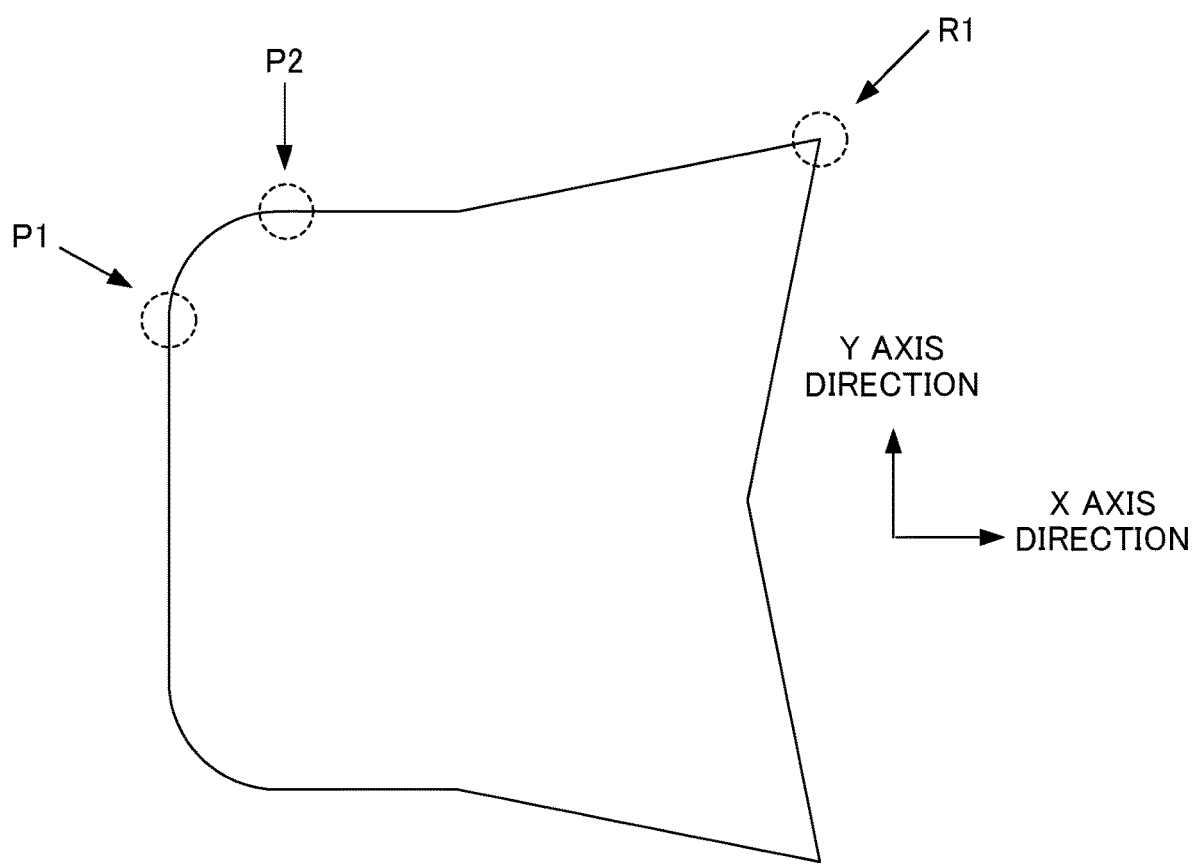
FIG. 13 is a diagram illustrating another example of a machining element according to a modification of the present invention.

FIG. 13 shows an example machining shape as a modification. As shown in FIG. 13, a machining workpiece serving as a learning object may have the shape having the combination of an R-shaped square and a star. At the position P1 in the machining shape shown in FIG. 13, the operation of the servo motor for moving the table in the X axis direction is shifted from stopping to rotating, whereby the motion of the table is shifted from linear motion in the Y axis direction to arc-like motion. At the position P2, the operation of the servo motor for moving the table in the Y axis direction is shifted from rotating to stopping, whereby the motion of the table is shifted from arc-like motion to linear motion in the X axis direction. On the other hand, at a position R1, both of the servo motor for moving the table in the X axis direction and the servo motor for moving the table in the Y axis direction are inverted. That is, in the machining shape shown in FIG. 13, the range including the position P1 and the position P2 is the learning element subjected to change in rotation speed under linear control, while the range including the position R1 is the learning element subjected to change in rotation speed under non-linear control. The machine learning part 210_1 in the first embodiment and a first compensating part 1031_1 are made to correspond to the range including the position P1 and the position P2, while the machine learning part 210_2 and a second compensating part 1031_2 are made to correspond to the range including the position R1, whereby a plurality of learning models are able to be generated with the learning object including plural and different types of learning elements, as in the first embodiment. It is noted that a machining shape having the plurality of characteristic machining elements shown in FIG. 7 to FIG. 12 may be used as another machining shape, and the detailed explanation thereof will be omitted.

(Modification 2)

In the first embodiment, the plurality of compensating parts included in the CNC device each for compensating a speed command are subjected to the learning. The present invention is not limited thereto. For example, a compensating part included in the CNC device for compensating a torque command, instead of the compensating part for compensating a speed command, may be subjected to the learning.

Figure 14:
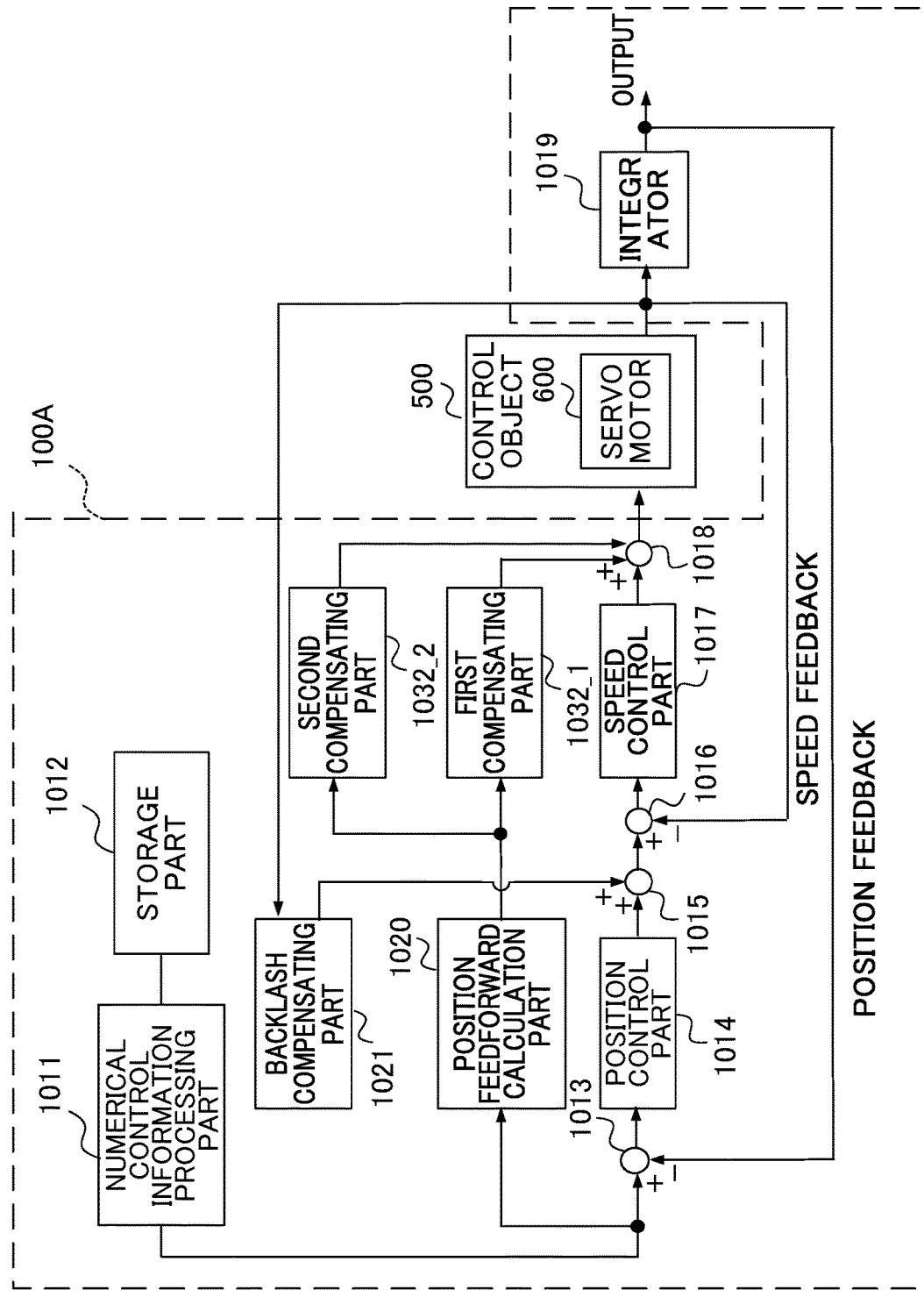
FIG. 14 is a block diagram illustrating one example of configuration of a CNC device 100A according to a modification of the present invention.

FIG. 14 shows the configuration of the CNC device 100A in the present modification. The CNC device 100A shown in FIG. 14 includes the first compensating part 1032_1 and the second compensating part 1032_2, unlike the CNC device 100 including the first compensating part 1031_1 and the second compensating part 1031_2, and the compensating parts respectively and individually correspond to the learning elements. The first compensating part 1032_1 and the second compensating part 1032_2 each calculates the compensation amount for a torque command, by corresponding to each of the characteristic machining elements, and outputs the resultant amount to an adder 1018. The adder 1018 adds a torque command value and the output value by each of the first compensating part 1032_1 and the second compensating part 1032_2, and outputs the resultant value as the torque command value controlled in feedforward processing to the servo motor 600 of the control object 500.

In the present modification, the CNC device 100A adjusts the control parameters of the first compensating part 1032_1 and the second compensating part 1032_2 by utilizing the machine learning device 200.

(Modification 3)

In the first embodiment of the present invention, each of the first compensating part 1031_1 corresponding to the position feedforward calculation part and the second compensating part 1031_2 corresponding to the backlash compensating part calculates the compensation amount for a speed command. In the modification 2 described above, each of a first compensating part 1032_1 and a second compensating part 1032_2 corresponding to a speed feedforward calculation part calculates the compensation amount for a torque command. The present invention is not limited thereto. In an example, the first compensating part 1033_1 and the second compensating part 1033_2 (not shown) may be configured so as to serve as compensating parts each for compensating a current command. That is, each of the two compensating parts corresponding to the current feedforward calculation part may calculate a compensation amount for a current command by corresponding to each of the characteristic machining elements.

(Modification 4)

In the first embodiment, each of the compensating parts compensates a speed command in the CNC device. The present invention is not limited thereto. In an example, the first compensating part 1031_1 and the second compensating part 1031_2 of the CNC device 100 may set default values of the control parameters in advance. In this case, none of the default parameter transmitting part 311 illustrated in FIG. 5A, and step S41 of the adjusting device 300 and step S61 of the CNC device 100 illustrated in FIG. 6A may be set.

(Modification 5)

The CNC device 100 may store the evaluation program in advance in the storage part 1012. In this case, none of the evaluation program storage part 305 and the evaluation program output part 306 of the adjusting device 300, and step S42 of the adjusting device 300 and step S62 of the CNC device 100 indicated in FIG. 6A may be set.

(Modification 6)

The CNC device 100 may execute the evaluation program on the basis of the command issued by an operator in step S63, without setting of the evaluation program execution command output part 307 nor step S44 of the adjusting device 300 indicated in FIG. 6B.

(Modification 7)

The CNC device 100 and the machine learning device 200 may directly exchange signals therebetween, not via the adjusting device 300. In this case, none of the feedback information acquiring part 308 and the feedback information transmitting part 301 of the adjusting device 300, and step S45 of the adjusting device 300 indicated in FIG. 6B for exchanging the feedback information may be set.

(Modification 8)

Similarly, there is no need to receive the notification to terminate the series of machining based on the evaluation program by the adjusting device 300 in step S46 of the adjusting device 300 indicated in FIG. 6B, nor to issue the command to calculate a reward or update the value function.

(Modification 9)

In step S48, the adjusting device 300 transmits the control parameter correction information received from the machine learning device 200, to the first compensating part 1031_1 corresponding to the machine learning part 210_1 or the second compensating part 1031_2 corresponding to the machine learning part 210_2, of the CNC device 100. In step S50, the adjusting device 300 outputs the control parameter setting information to the first compensating part 1031_1 corresponding to the machine learning part 210_1 or the second compensating part 1031_2 corresponding to the machine learning part 210_2. The present invention is not limited thereto. In an example, the adjusting device 300 may transmit the control parameter correction information and the control parameter setting information to both of the first compensating part 1031_1 and the second compensating part 1031_2, and the first compensating part 1031_1 and the second compensating part 1031_2 respectively may use the control parameter correction information and the control parameter setting information corresponding to the respective parts themselves.

(Modification 10)

Figure 15:
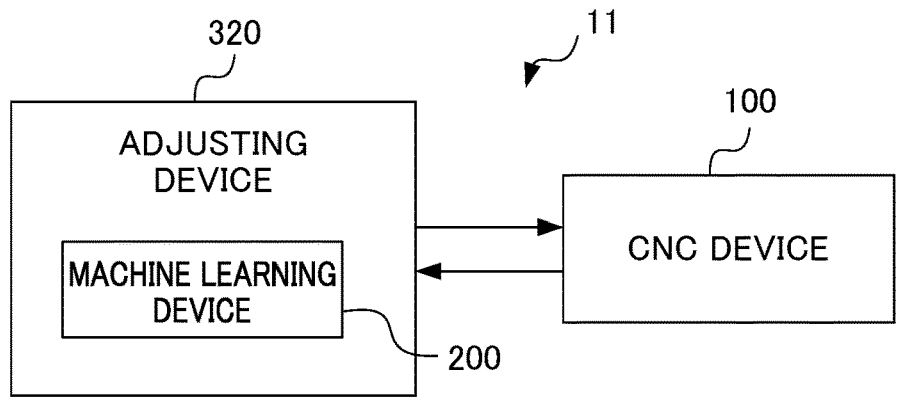
FIG. 15 is a block diagram illustrating an adjusting system according to a modification of the present invention.

FIG. 15 is a block diagram illustrating an adjusting system according to a modification 10 of the present invention. The CNC device 100 and the machine learning part 210 included in the machine learning device 200 according to the present embodiment respectively have the same configurations as those of the CNC device 100 and the machine learning part 210 shown in FIG. 1, FIG. 2, and FIG. 4, and accordingly the same numbers are assigned to those and the explanations thereof will be omitted. In an adjusting system 11 according to the present embodiment, an adjusting device 320 includes the machine learning device 200. The configuration of the adjusting device 320 is the same as the configuration of the adjusting device 300 shown in FIG. 5A and FIG. 5B, except for the machine learning device 200. The adjusting device 320 and the CNC device 100 are directly connected to each other via a connection interface, or connected via a network, whereby mutual communication is enabled to be performed. The network is, for example, a LAN (Local Area Network) built in a factory, the Internet, a public telephone network, or a combination of these. The present invention is not limited to a specific communication method for a network, nor to a wired connection or a wireless connection.

(Modification 11)

Figure 16:
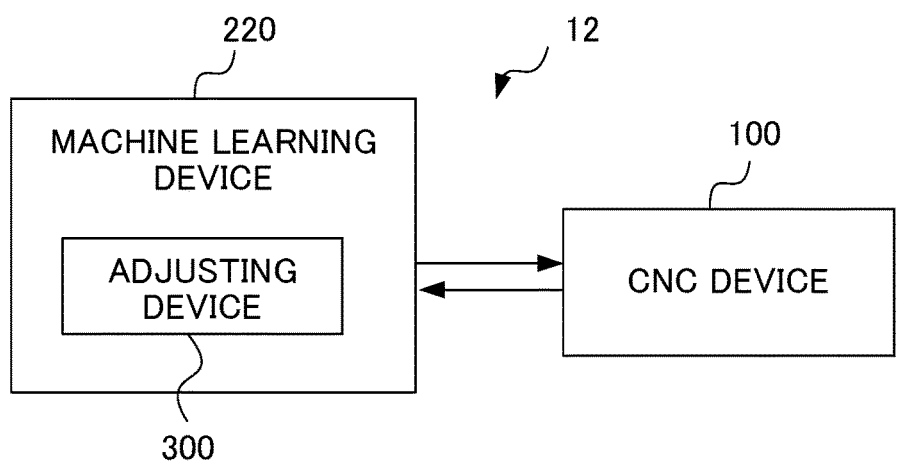
FIG. 16 is a block diagram illustrating an adjusting system according to a modification of the present invention.

FIG. 16 is a block diagram illustrating an adjusting system according to a modification 11 of the present invention. The CNC device 100 and the adjusting device 300 according to the present embodiment respectively have the same configurations as those of the CNC device 100 and the adjusting device 300 shown in FIG. 1, FIG. 2, FIG. 5A and FIG. 5B, and accordingly the same numbers are assigned to those and the explanations thereof will be omitted. In an adjusting system 12 according to the present embodiment, a machine learning device 220 includes the adjusting device 300. The configuration of the machine learning device 220 is the same as the configuration of the machine learning device 200 including the plurality of machine learning parts 210 shown in FIG. 4, except for the adjusting device 300. The CNC device 100 and the machine learning device 220 are directly connected to each other via a connection interface, or connected via a network, whereby mutual communication is enabled to be performed. The network is, for example, a LAN (Local Area Network) built in a factory, the Internet, a public telephone network, or a combination of these. The present invention is not limited to a specific communication method for a network, nor to a wired connection or a wireless connection.

(Modification 12)

Figure 17:
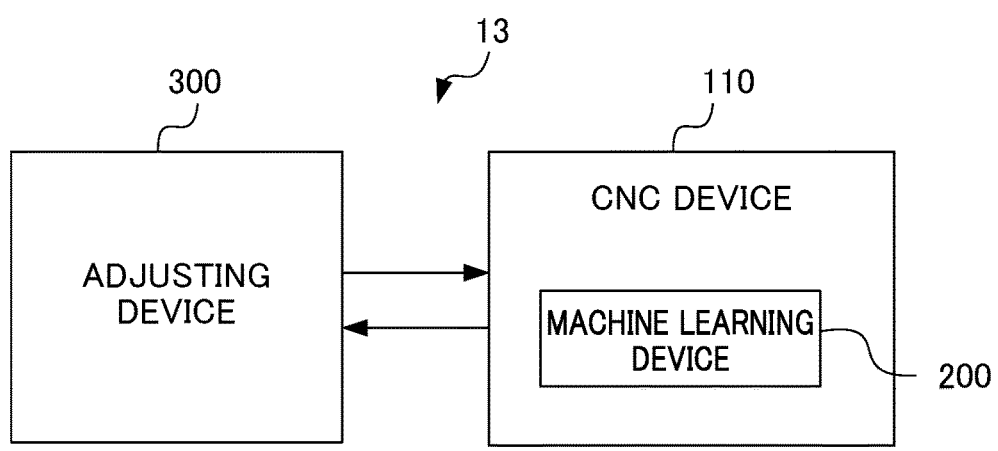
FIG. 17 is a block diagram illustrating an adjusting system according to a modification of the present invention.

FIG. 17 is a block diagram illustrating an adjusting system according to a modification 12 of the present invention. The machine learning device and the adjusting device according to the present embodiment respectively have the same configurations as those of the machine learning device 200 including the plurality of machine learning parts 210 and the adjusting device 300 shown in FIG. 1, FIG. 4, FIG. 5A and FIG. 5B, and accordingly the same numbers are assigned to those and the explanations thereof will be omitted. In an adjusting system 13 according to the present embodiment, a CNC device 110 includes the machine learning device 200. The configuration of the CNC device 110 is the same as the configuration of the CNC device 100 shown in FIG. 2, except for the machine learning device 200. The CNC device 110 and the adjusting device 300 are directly connected to each other via a connection interface, or connected via a network, whereby mutual communication is enabled to be performed.

(Modification 13)

Figure 18:
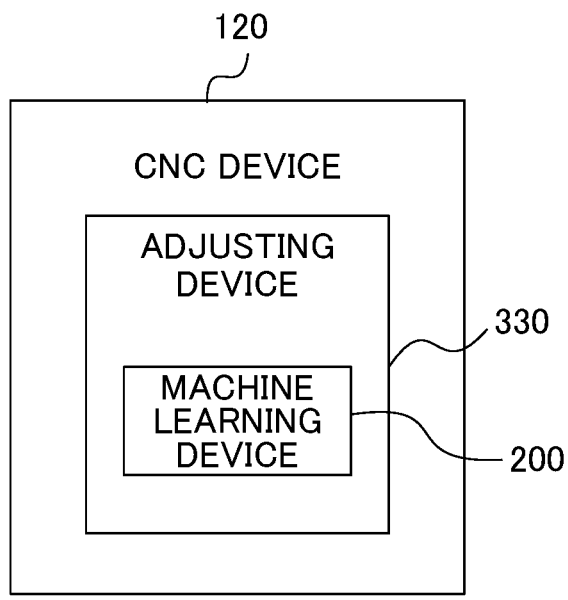
FIG. 18 is a block diagram illustrating a CNC device according to a modification of the present invention.

FIG. 18 is a block diagram illustrating a CNC device according to a modification 13 of the present invention. A CNC device 120 according to the present embodiment includes an adjusting device 330, and further the adjusting device 330 includes the machine learning device 200. The configuration of the CNC device 120 is the same as the configuration of the CNC device 100 shown in FIG. 2, except for the adjusting device 330 including the machine learning device 200. The CNC device 120 includes a control part having the same configuration as the configuration of the control part of the CNC device 100. In the present embodiment, application software for executing the functions of the adjusting device 330 including the functions of the machine learning device 200 is enabled to be executed on the operation system of the CNC device 120.
(Modification 14)

Figure 19:
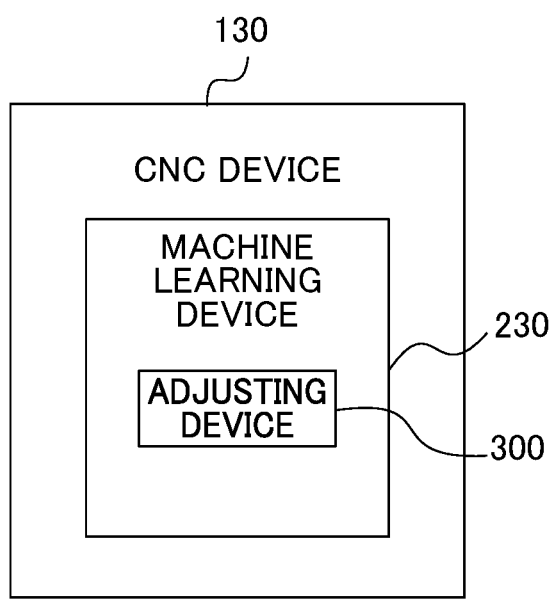
FIG. 19 is a block diagram illustrating a CNC device according to a modification of the present invention.

FIG. 19 is a block diagram illustrating a CNC device according to a modification 14 of the present invention. A CNC device 130 according to the present embodiment includes a machine learning device 230, and further the machine learning device 230 includes the adjusting device 300. The configuration of the CNC device 130 is the same as the configuration of the CNC device 100 shown in FIG. 2, except for the machine learning device 230 including the adjusting device 300. The CNC device 130 includes a control part having the same configuration as the configuration of the control part of the CNC device 100. In the present embodiment, application software for executing the functions of the machine learning device 230 including the adjusting device 300 is enabled to be executed on the operation system of the CNC device 130.

A servo control device not shown, instead of the servo control part, may be disposed separately from the CNC device.
(Modification 15)

In the first embodiment, the feedback information to be used by the machine learning device to perform the reinforcement learning is the combination of the positional error and the coefficients of the transfer functions in the first compensating part 1031_1 and the second compensating part 1031_2. The present invention is not limited to the feedback information including the positional error. The feedback information may include at least one of the position command and the position feedback (detected position value) in addition to the positional error. The feedback information may further additionally include at least one of speed command, speed feedback, speed error, current command, current feedback, current error, and backlash compensation amount. The position command corresponds to the output of the numerical control information processing part 1011, and the position feedback corresponds to the output of the integrator 1019. The speed command corresponds to the output of the adder 1015. The speed feedback (detected speed value) corresponds to the output of the rotary encoder associated with the servo motor 600. The speed error corresponds to the output of the subtracter 1016. The current command corresponds to the output of the adder 1018. The current feedback corresponds to the detected value of the current flowing to the servo motor 600. The current error corresponds to the output of a subtracter 1013. The backlash compensation amount corresponds to the output of a backlash compensating part 1021.

Each of the components included in the CNC devices 100 to 130, the machine learning devices 200, 220, 230, and the adjusting devices 300, 320, 330 is able to be realized by hardware, software, or a combination of these. The adjusting method to be performed by cooperation of the above-described components of the CNC devices 100 to 130, the machine learning devices 200, 220, 230, and the adjusting devices 300, 320, 330 is also able to be realized by hardware, software, or a combination of these. Herein, to be realized by software means to be realized when a computer reads and executes a program.

Programs are stored by use of various types of non-transitory computer readable media, and are able to be supplied to a computer. Non-transitory computer readable media include various types of tangible storage media. Examples of the non-transitory computer readable media include: a magnetic recording medium (e.g. flexible disk, magnetic tape, hard disk drive); a magneto-optical recording medium (e.g. magneto-optical disk); CD-ROM (Read Only Memory); CD-R; CD-R/W; and semiconductor memory (e.g. Mask ROM, PROM (Programmable ROM), EPROM (Erasable PROM), flash ROM, and RAM (random access memory)). Programs may be supplied to a computer by various types of transitory computer readable media. Examples of the transitory computer readable media include an electrical signal, an optical signal, and an electromagnetic wave. A transitory computer readable medium is capable of supplying a program to a computer via a wired communication path such as a wire and an optical fiber, or a wireless communication path.

The machine learning devices 200, 220, 230 according to the above-described embodiments have been described by use of the examples with respect to reinforcement learning. The present invention is not limited thereto. The present invention may be applied to another method, for example, "supervised learning," or "unsupervised learning."

Moreover, the feedback information may be appropriately selected depending on the object for the machine learning or by a method of machine learning.
<Freedom in System Configuration>

In the embodiment described above and shown in FIG. 1, the CNC device 100 and the machine learning device 200 are communicably connected as a one-to-one pair. Alternatively, for example, one unit of the machine learning device 200 and a plurality of the CNC devices 100 may be communicably connected via a network 400, so that the machine learning is performed in each of the CNC devices 100. In this case, a distributed processing system may be adopted, in which respective functions of the machine learning device 200 are distributed to a plurality of servers as is appropriate. Alternatively, respective functions of the machine learning device 200 may be realized by use of a virtual server function or the like in the cloud.

In the case of the configuration including a plurality of CNC devices 100_1 to 100_n having the same model name or the same specification or in the same series, and a plurality of machine learning devices 200_1 to 200_n respectively corresponding to the CNC devices, the learning results by the respective machine learning devices 200_1 to 200_n may be shared. Such a configuration enables to build a more optimal model. In the modifications shown in FIG. 15 and FIG. 17, one adjusting device is disposed for one CNC device. Alternatively, one adjusting device may be disposed for a plurality of CNC devices. In the modification shown in FIG. 16, one machine learning device is disposed for one CNC device. Alternatively, one adjusting device may be disposed for a plurality of CNC devices.

EXPLANATION OF REFERENCE NUMERALS

10, 11, 12, 13 ADJUSTING SYSTEM
100, 110, 120, 130 CNC DEVICE
200 220 230 MACHINE LEARNING DEVICE
210 MACHINE LEARNING PART
300, 310, 320, 330 ADJUSTING DEVICE

301 FEEDBACK INFORMATION TRANSMITTING PART
302 PARAMETER SETTING INFORMATION ACQUIRING PART
303 PARAMETER CORRECTION INFORMATION ACQUIRING PART
304 STARTUP COMMAND OUTPUT PART
305 EVALUATION PROGRAM STORAGE PART
306 EVALUATION PROGRAM OUTPUT PART
307 EVALUATION PROGRAM EXECUTION COMMAND OUTPUT PART
308 FEEDBACK INFORMATION ACQUIRING PART
309 PARAMETER SETTING INFORMATION TRANSMITTING PART
310 PARAMETER CORRECTION INFORMATION TRANSMITTING PART
311 DEFAULT PARAMETER TRANSMITTING PART
312 CONTROL PART

What is claimed is:

1. An adjusting device configured to control a control device configured to control a motor configured to drive at least two axes and control a machine learning device having a plurality of machine learning parts configured to perform machine learning to the control device, the plurality of machine learning parts respectively learning a plurality of different learning elements based on a different learning model, the plurality of different learning elements respectively corresponding to a plurality of different characteristic machining elements, the adjusting device comprising:
a startup command output part configured to output a startup command to start the machine learning device;
a storage part configured to store an evaluation program for machining a workpiece including a plurality of different learning elements;
an evaluation program output part configured to output the evaluation program to the control device;
an evaluation program execution command output part configured to cause the control device to execute the evaluation program;
a feedback information acquiring part configured to acquire, from the control device, feedback information obtained when the evaluation program is executed in the control device;
a determination part configured to determine, based on machining position information during execution of the evaluation program, which learning element among the plurality of different learning elements corresponds to the feedback information acquired from the control device;
a feedback information transmitting part configured to transmit the feedback information acquired from the control device to one machine learning part from among the plurality of machine learning parts corresponding to the learning element determined to correspond to the feedback information acquired from the control device;
a parameter correction information acquiring part configured to acquire, from the one machine learning part, control parameter correction information corresponding the learning element determined to correspond to the feedback information acquired from the control device and obtained through machine learning performed by the one machine learning part using the feedback information acquired from the control device;
a parameter correction information transmitting part configured to (i) transmit, to the control device, the control parameter correction information acquired from the one machine learning part, (ii) cause the control device to correct a control parameter corresponding to the control parameter correction information acquired from the one machine learning part, and (iii) repeat a series of machining by the evaluation program;
a parameter setting information acquiring part configured to (i) transmit a command to terminate the machine learning to the machine learning device, and (ii) after the machine learning is terminated, acquire different control parameter setting information from each of the plurality of machine learning parts; and
a parameter setting information transmitting part configured to transmit, to the control device, the different control parameter setting information acquired from each of the plurality of machine learning parts.

2. The adjusting device according to claim 1, wherein the feedback information includes at least one of a position command, a position feedback, and a positional error.

3. The adjusting device according to claim 2, wherein the feedback information further includes at least one of a speed command, a speed feedback, and a speed error.

4. The adjusting device according to claim 2, wherein the feedback information further includes at least one of a current command, a current feedback, and a current error.

5. The adjusting device according to claim 2, wherein the feedback information further includes backlash compensation.

6. The adjusting device according to claim 1, the adjusting device comprising:
a parameter correction information transmitting part configured to transmit the control parameter correction information obtained from the one machine learning part as action information to the control device, wherein
the machine learning performed by the one machine learning part is reinforcement learning, and
the feedback information acquiring part acquires the feedback information as state information from the control device.

7. The adjusting device according to claim 1, wherein the control device includes a plurality of position feedforward calculation parts, a plurality of speed feedforward calculation parts, a plurality of current feedforward calculation parts and a plurality of backlash compensating parts, and
in at least one of the plurality of position feedforward calculation parts, the plurality of speed feedforward calculation parts, the plurality of current feedforward calculation parts and the plurality of backlash compensating parts, a control parameter is set or updated by the control parameter setting information acquired from one of the machine learning parts corresponding to the at least one.

8. The adjusting device according to claim 1, wherein the adjusting device includes the machine learning device.

9. The adjusting device according to claim 1, wherein the adjusting device is included in the machine learning device.

10. The adjusting device according to claim 1, wherein the control device includes the machine learning device.

11. The adjusting device according to claim 1, wherein the adjusting device is included in the control device, and further includes the machine learning device.

12. The adjusting device according to claim 1, wherein the adjusting device is included in the machine learning device, and the machine learning device is included in the control device.

13. An adjusting method of an adjusting device for controlling a control device configured to control a motor configured to drive at least two axes and controlling a machine learning device having a plurality of machine learning parts configured to perform machine learning to the control device, the plurality of machine learning parts respectively learning a plurality of different learning elements based on a different learning model, the plurality of different learning elements respectively corresponding to a plurality of different characteristic machining elements, the adjusting method comprising:

starting the machine learning device;

outputting, to the control device, an evaluation program for machining a workpiece including a plurality of different learning elements, the evaluation program being stored by the adjusting device;

causing the control device to execute the evaluation program;

acquiring, from the control device, feedback information obtained when the evaluation program is executed in the control device;

determining, based on machining position information during execution of the evaluation program, which learning element among the plurality of different learning elements corresponds to the feedback information acquired from the control device;

transmitting the feedback information acquired from the control device to one machine learning part from among the plurality of machine learning parts of the machine learning device corresponding to the learning element determined to correspond to the feedback information acquired from the control device;

acquiring, from the one machine learning part, control parameter correction information corresponding the learning element determined to correspond to the feedback information acquired from the control device and obtained through machine learning performed by the one machine learning part using the feedback information acquired from the control device;

(i) transmitting, to the control device, the control parameter correction information acquired from the one machine learning part, (ii) causing the control device to correct a control parameter corresponding to the control parameter correction information acquired from the one machine learning part, and (iii) repeating a series of machining by the evaluation program;

(i) transmitting a command to terminate the machine learning to the machine learning device, and (ii) after the machine learning is terminated, acquiring different control parameter setting information from each of the plurality of machine learning parts; and transmitting, to the control device, the different control parameter setting information acquired from each of the plurality of machine learning parts.

* * * * *